US012300911B2

(12) United States Patent
Wang et al.

(10) Patent No.: US 12,300,911 B2
(45) Date of Patent: May 13, 2025

(54) ANTENNA UNIT AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Feng Qu, Beijing (CN); Biqi Li, Beijing (CN); Xichao Fan, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/016,357

(22) PCT Filed: Feb. 28, 2022

(86) PCT No.: PCT/CN2022/078168
§ 371 (c)(1),
(2) Date: Jan. 16, 2023

(87) PCT Pub. No.: WO2023/159538
PCT Pub. Date: Aug. 31, 2023

(65) Prior Publication Data
US 2024/0250433 A1 Jul. 25, 2024

(51) Int. Cl.
*H01Q 5/28* (2015.01)
*H01Q 1/22* (2006.01)
(Continued)

(52) U.S. Cl.
CPC ............... *H01Q 9/045* (2013.01); *H01Q 1/22* (2013.01); *H01Q 1/48* (2013.01)

(58) Field of Classification Search
CPC ............. H01Q 9/045; H01Q 1/22; H01Q 1/48
See application file for complete search history.

(56) References Cited

U.S. PATENT DOCUMENTS

| | | | | |
|---|---|---|---|---|
| 5,043,738 A * | 8/1991 | Shapiro | H01Q 9/0457 | 343/700 MS |
| 2021/0273319 A1* | 9/2021 | Liu | H01Q 15/0006 | |

FOREIGN PATENT DOCUMENTS

| | | |
|---|---|---|
| CN | 108493589 A | 9/2018 |
| CN | 113328255 A | 8/2021 |

(Continued)

OTHER PUBLICATIONS

Shuosheng Ji et al., "Bandpass Filter Inspired Filtering Patch Antenna", IEEE MTT-S International Wireless Symposium, 2021.

(Continued)

*Primary Examiner* — David E Lotter
(74) *Attorney, Agent, or Firm* — Ling Wu; Stephen Yang; Ling and Yang Intellectual Property

(57) ABSTRACT

Disclosed are an antenna unit and an electronic device, wherein the antenna unit includes a dielectric substrate, an antenna layer and a ground layer located on both sides of the dielectric substrate; wherein the antenna layer includes a microstrip feed line, a radiation patch and a microstrip coupling line structure located on a side of the microstrip feed line in a first direction, the microstrip coupling line structure comprises a first branch structure, a microstrip coupling line and a second branch structure that are sequentially connected along the first direction, the first branch structure is arranged at intervals with the microstrip feed line, and the ground layer includes a floor groove, wherein there is a first overlapping area between an orthographic projection of the floor groove on the dielectric substrate and an orthographic projection of the microstrip feed line on the dielectric substrate.

18 Claims, 18 Drawing Sheets

(51) Int. Cl.
*H01Q 1/48* (2006.01)
*H01Q 9/04* (2006.01)

(56) References Cited

FOREIGN PATENT DOCUMENTS

| | | |
|---|---|---|
| CN | 113314838 B | 10/2021 |
| CN | 113675607 A | 11/2021 |

OTHER PUBLICATIONS

Shuosheng Ji et al., "Bandpass Filter Prototype Inspired Filtering Patch Antenna/Array", IEEE Transactions on Antennas and Propagation, Apr. 9, 2021.

* cited by examiner

| Name | Theta | Ang | Mag |
|---|---|---|---|
| m1 | 0.0000 | 0.0000 | 7.8980 |
| m2 | 0.0000 | 0.0000 | -22.9286 |

ANTENNA UNIT AND ELECTRONIC DEVICE

CROSS-REFERENCE TO RELATED APPLICATION

The present application is a U.S. National Phase Entry of International Application No. PCT/CN2022/078168 having an international filing date of Feb. 28, 2022. The above-identified application is hereby incorporated by reference.

TECHNICAL FIELD

Embodiments of the present disclosure relate to, but are not limited to, the field of communication technologies, and in particular to an antenna unit, and an electronic device.

BACKGROUND

Antenna and filter are two important components of radio frequency front end, in which antenna is responsible for receiving/transmitting electromagnetic signals and filter is responsible for filtering interference signals. Their performance plays a decisive role in the overall working quality of wireless communication system. At present, with the development of electronic device, in order to comply with the development trend of miniaturization and integration of wireless communication systems, filtering antenna has been proposed and attracted wide attention. Among them, filtering antenna is an antenna unit that can integrate the filtering function of traditional filter and the radiation function of antenna in the same device.

SUMMARY

The following is a summary of subject matters described herein in detail. The summary is not intended to limit the protection scope of claims.

In one aspect, the embodiments of the present disclosure provide an antenna unit comprising a dielectric substrate, an antenna layer and a ground layer located on both sides of the dielectric substrate; wherein the antenna layer comprises a microstrip feed line, a radiation patch and a microstrip coupling line structure located on a side of the microstrip feed line in a first direction, the microstrip coupling line structure comprises a first branch structure, a microstrip coupling line and a second branch structure that are sequentially connected along the first direction, the first branch structure is arranged at intervals with the microstrip feed line, and the ground layer includes a floor groove, wherein there is a first overlapping area between an orthographic projection of the floor groove on the dielectric substrate and an orthographic projection of the microstrip feed line on the dielectric substrate, and there is a second overlapping area between the orthographic projection of the floor groove and an orthographic projection of the first branch structure on the dielectric substrate.

In another aspect, the embodiment of the present disclosure further provides an electronic device, including the antenna unit according to the aforementioned embodiments.

Other characteristics and advantages of the present disclosure will be elaborated in the following specification, and moreover, partially become apparent from the specification or are understood by implementing the present disclosure. Other advantages of the present disclosure may be achieved and obtained through solutions described in the specification and drawings.

Other aspects may be understood upon reading and understanding the drawings and the detailed description.

BRIEF DESCRIPTION OF DRAWINGS

The drawings are used for providing understanding of technical solutions of the present disclosure, constitute a part of the specification, and together with the embodiments of the present disclosure, are used for explaining the technical solutions of the present disclosure but not to form limitations on the technical solutions of the present disclosure. Shapes and sizes of each component in the drawings do not reflect actual scales, and are only intended to schematically illustrate contents of the present disclosure.

DETAILED DESCRIPTION

Figure 1:
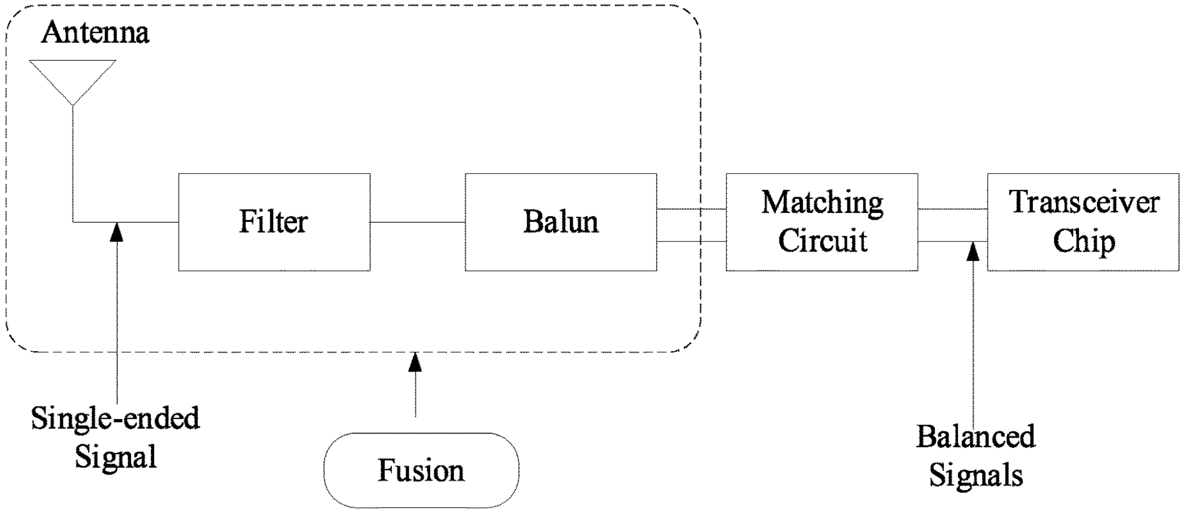
FIG. 1 is a schematic diagram of a structure of a filtering antenna.

However, the description is exemplary and unrestrictive, and more embodiments and implementation solutions are possible within a scope contained in the embodiments described herein. Although many possible feature combinations are shown in the drawings and discussed in exemplary implementation modes, many other combinations of the disclosed features are possible. Unless expressly limited, any feature or element of any embodiment may be used in combination with, or may replace, any other feature or element in any other embodiment.

When a representative embodiment is described, a method or process may already be presented in a specific sequence of acts in the specification. However, to an extent that the method or process does not depend on a specific sequence of the acts herein, the method or process should not be limited to the acts in the specific sequence. As will be understood by those of ordinary skill in the art, other act orders are possible. Therefore, the specific order of the acts illustrated in the specification should not be interpreted as a limitation on claims. In addition, the claims with respect to the method or process should not be limited to execute their steps according to the written sequence. Those skilled in the art may easily understand that these sequences may change, and are still maintained in the spirit and scope of the embodiments of the disclosure.

In the drawings, a size of each constituent element, a thickness of a layer, or a region is exaggerated sometimes for clarity. Therefore, an implementation of the present disclosure is not necessarily limited to the size shown, and a shape and size of each component in the drawings do not reflect true proportions. In addition, the drawings schematically illustrate ideal examples, and one implementation of the present disclosure is not limited to the shapes, numerical values, or the like shown in the drawings.

The "first", "second", "third" and other ordinal numbers in the exemplary embodiments of the present disclosure are used to avoid confusion of constituent elements, not to provide any quantitative limitation.

In the exemplary embodiments of the present disclosure, for the sake of convenience, wordings such as "central", "upper", "lower", "front", "rear", "vertical", "horizontal", "top", "bottom", "inner", "outer" and the others describing the orientations or positional relations are used to depict the relationship of constituent elements with reference to the drawings, which are only for an easy and simplified description of the present disclosure, rather than for indicating or implying that the device or element referred to must have a specific orientation, or must be constructed and operated in a particular orientation and therefore, those wordings cannot be construed as limitations on the present disclosure. The positional relationships between the constituent elements may be changed as appropriate according to a direction according to which each constituent element is described. Therefore, appropriate replacements may be made according to situations without being limited to the wordings described in the specification.

In the exemplary embodiments of the present disclosure, the terms "install", "connect" and "couple" shall be broadly understood unless otherwise explicitly specified and defined. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the exemplary embodiments of the present disclosure, "an electrical connection" includes a case where constituent elements are connected via an element having a certain electrical action. The "element with the certain electrical effect" is not particularly limited as long as electrical signals may be sent and received between the connected constituent elements. For example, "the elements with the certain electrical effect" may be electrodes or wirings, or switch elements, such as transistors, or other functional elements, such as resistors, inductors, capacitors, or the like.

In the exemplary embodiments of the present disclosure, "parallel" refers to a state in which two straight lines form an angle above −10 degrees and below 10 degrees, and thus also includes a state in which the angle is above −5 degrees and below 5 degrees. In addition, "perpendicular" refers to a state in which an angle formed by two straight lines is above 80° and below 100°, and thus also includes a state in which the angle is above 85° and below 95°.

In the exemplary embodiments of the present disclosure, "about" means that there is not strict limit for a value, and values within an error range during processes and measurement are allowed.

In the exemplary embodiments of the present disclosure, the first direction Y may refer to a horizontal direction, the second direction X may refer to a vertical direction, and the third direction Z may refer to a direction perpendicular to the plane of the antenna unit or a thickness direction of the antenna unit etc. For example the first direction Y and the second direction X may be perpendicular to each other, and the first direction Y and the third direction Z may be perpendicular to each other.

Generally speaking, in the module of the radio frequency front end, the output of the transceiver chip is a balanced signal, including two reverse signals with equal amplitude, namely differential signal. Compared with single-ended signal, differential signal can greatly reduce the interference of common-mode signal and environmental noise. However, as shown in FIG. 1, the antenna is a single-port device, and it is necessary to connect the Balun device for balanced-unbalanced signal conversion before the signal enters the antenna, while the introduction of Balun device not only increases the insertion loss of the system, but also introduces unnecessary signals. In order to filter clutter, the antenna and Balun device can be directly cascaded with additional filter circuit, which in turn introduces additional insertion loss and increases the volume of the system.

The embodiments of the present disclosure provide an antenna unit, the antenna unit comprising: a dielectric substrate, an antenna layer and a ground layer located on both sides of the dielectric substrate; wherein, the antenna layer may comprise: a microstrip feed line, a radiation patch and a microstrip coupling line structure located on a side of the microstrip feed line in the first direction Y, the microstrip coupling line structure may comprise: a first branch structure, a microstrip coupling line and a second branch structure that are sequentially connected along a first direction Y, the first branch structure is arranged at intervals with the microstrip feed line, the ground layer may include a floor groove, and there is a first overlapping area between an orthographic projection of the floor groove on the dielectric substrate and an orthographic projection of the microstrip feed line on the dielectric substrate, and a second overlapping area between the orthographic projection of the floor groove and an orthographic projection of the first branch structure on the dielectric substrate.

In this way, by arranging a microstrip feed line, a first branch structure in the microstrip coupling line structure which are overlapped with the floor groove, on the one hand, a conversion structure formed by the floor groove, the microstrip coupling line structure and the microstrip feed line can achieve the conversion between the single-ended signal and the differential signal, and the hybrid electromagnetic coupling can also be achieved in the antenna unit, wherein an excitation is made between the first branch structure and the microstrip feed line by adjacent coupling, so that a gap capacitance between the microstrip feed line and the microstrip coupling line structure can achieve an electrical coupling path; and microstrip feed line and floor groove can achieve a magnetic coupling path, so that the antenna unit can form a radiation zero point on both sides of a passband respectively, because strengths and phases of the two coupling paths are different. When the phases of the signals transmitted along the two coupling paths are opposite, the magnetic coupling will be offset by an electrical coupling, thus enhancing the out-of-band suppression level. On the other hand, because the conversion structure formed by the floor groove, the microstrip coupling line structure and the microstrip feed line can achieve the conversion between the single-ended signal and the differential signal, the introduction of additional filter circuit and the loading of complicated parasitic structure can be avoided, thereby, the antenna unit has the characteristics of simple antenna structure, small size, low structure profile, low cost, easy to be machined and easy to be integrated with other modules, which is beneficial to the miniaturization and integrated design of the module of the radio frequency front end. On the other hand, because the floor groove, the conversion structure formed by the microstrip coupling line structure and the microstrip feed line can achieve better filtering function, and the introduction of additional filtering circuits can be avoided, thus avoiding introducing insertion loss. On the other hand, through the conversion structure formed by the floor groove, the microstrip coupling line structure and the microstrip feed line, a hybrid electromagnetic coupling excitation antenna is achieved, which can reduce the cross polarization level of the antenna unit, improve the radiation efficiency of the antenna unit, and make the gain flatness of the antenna unit in the passband better, thus making the antenna unit have excellent antenna performance.

In an exemplary embodiment, an excitation is made between the first branch structure and the feed line in the microstrip coupling line structure by adjacent coupling, so a conversion structure formed by overlapping of the microstrip coupling line structure, the microstrip feed line with the floor groove excites the microstrip coupling line structure, and the microstrip coupling line structure excites the radiation patch.

In an exemplary embodiment, the dielectric substrate has a first reference line extending along a first direction Y and a second reference line extending along a second direction X, at least one of the floor groove, the radiation patch, the first branch structure, the microstrip coupling line, and the second branch structure is arranged symmetrically with respect to the first reference line, and the microstrip feed line is arranged symmetrically with respect to the second reference line, the first reference line being perpendicular to the second reference line. For example the first reference line may be a center line CL of the dielectric substrate extending along the first direction Y. Here, no limit is made thereto in the embodiment of the present disclosure.

In an exemplary embodiment, the floor groove may be in a "-" shape, an "H" shape, a dumbbell shape, or the like. For example, the shape of the floor groove may be a combination of one or more of the elongated shapes such as a rectangle or an oval. For example, the floor grooves may be arranged with equal width, so that the shape of the floor grooves may be in a "-" shape. Here, no limit is made thereto in the embodiment of the present disclosure.

In an exemplary embodiment, the floor grooves can be arranged with non-equal width, taking an example that the shape of the floor groove is an "H" shape as an example, the floor groove may include a first groove, a second groove and a third groove arranged in sequence along a first direction Y, wherein an orthographic projection of a first end of the second groove on the dielectric substrate is located in the first overlapping area, and an orthographic projection of a second end of the second groove on the dielectric substrate is located in the second overlapping area. Among them, a width of the second groove is different from a width of the first groove and a width of the third groove. For example, the width of the second groove is smaller than the width of the first groove, and is smaller than the width of the third groove. For example, the width of the second groove is smaller than the width of the first groove, and the width of the first groove is equal to the width of the third groove. The width of the groove is a dimensional characteristic along a second direction X perpendicular to the first direction Y. Here, no limit is made thereto in the embodiment of the present disclosure.

In an exemplary embodiment, at least one of a width of the first groove, a width of the second groove, and a width of the third groove may be about 0.25 mm to 1.8 mm. Here, no limit is made thereto in the embodiment of the present disclosure.

In an exemplary embodiment, a length of the second groove may be about 2.0 mm to 2.65 mm, and the length of the groove refers to a dimensional characteristic along a first direction Y. Here, no limit is made thereto in the embodiment of the present disclosure.

In an exemplary embodiment, the microstrip coupling lines may be an axisymmetric structure, and the symmetry axis of the microstrip coupling lines may be a center line CL of the dielectric substrate. For example, the microstrip coupling lines may include a first microstrip coupling line and a second microstrip coupling line located on both sides of the radiation patch in a second direction respectively, and the first microstrip coupling line and the second microstrip coupling line may be symmetrically arranged on both sides of the center line CL of the dielectric substrate. For example, taking an example that the radiation patch is in a circular shape, the shapes of the first microstrip coupling line and the second microstrip coupling line may be arc-shaped. Here, no limit is made thereto in the embodiment of the present disclosure.

In an exemplary embodiment, the microstrip coupling line, the first branch structure, and the second branch structure may be an integral structure connected to each other. Here, the "integral structure" in the embodiments of the present disclosure may refer to a structure formed by two (or more) structures which are formed by the same deposition process and are patterned by the same composition process so as to connect to each other, and their materials may be the same or different.

In an exemplary embodiment, the microstrip feed line, the radiation patch, the microstrip coupling line, the first branch structure and the second branch structure may be arranged in the same layer and in the same material. In this way, the increase of metal layers may be avoided, and the low profile planar design of the antenna unit may be achieved. Here, in the embodiment of the present disclosure, "same layer arrangement" is referred to a structure formed by two (or more) structures formed by the same deposition process and patterned through the same composition process, and their materials may be the same or different. For example, the materials of the precursors forming a plurality of structures arranged in the same layer are the same, and the resulting materials may be the same or different.

In an exemplary embodiment, the first branch structure may be an axisymmetric structure. For example, a symmetry axis of the first branch structure may be a center line CL of the dielectric substrate. For example, the first branch structure may include a first branch extending along a first direction Y and a second branch extending along the first direction Y, the first branch and the second branch may be symmetrically arranged on both sides of the center line CL of the dielectric substrate. For example, both the first branch and the second branch may include two "L" shaped branches connected sequentially. Here, no limit is made thereto in the embodiment of the present disclosure.

In an exemplary embodiment, the first branch structure may be a closed branch structure. For example, the first branch structure may include: a first branch and a second branch which are located on the a side of the radiation patch in an opposite direction of a direction Y, wherein a first end of the first branch is connected with a first end of the second branch, a second end of the first branch is connected with a first end of the first microstrip coupling line, and a second end of the second branch is connected with a first end of the second microstrip coupling line. For example, a body portion of the first branch extends along the first direction Y, and a body portion of the second branch extends along the first direction Y.

In an exemplary embodiment, the first branch may include a first sub-branch and a second sub-branch, and the second branch may include a third sub-branch and a fourth sub-branch, wherein a first end of the first sub-branch is connected with a first end of the third sub-branch, a second end of the first sub-branch is connected with a first end of the second sub-branch, a second end of the second sub-branch is connected to a first end of the first microstrip coupling line, a second end of the third sub-branch is connected to a first end of the fourth sub-branch, and a second end of the fourth sub-branch is connected to a first end of the second microstrip coupling line. The first sub-branch, the second sub-branch, the third sub-branch and the fourth sub-branch may be "L" shaped branches.

In an exemplary embodiment, the second branch structure may be a parallel branch structure having a certain length. For example, the second branch structure may be any one of an open-circuit branch structure, a short-circuit branch structure, and a closed branch structure. Here, no limit is made thereto in the embodiment of the present disclosure.

In an exemplary embodiment, the second branch structure may be an axisymmetric structure. For example, a symmetry axis of the second branch structure may be a center line CL of the dielectric substrate. For example, the second branch structure may include a third branch extending along a first direction Y and a fourth branch extending along a first direction Y, wherein the third branch and the fourth branch may be symmetrically arranged on both sides of the center line CL of the dielectric substrate.

In an exemplary embodiment, the second branch structure includes a third branch and a fourth branch which are located on a side of the radiation patch in a first direction Y, wherein a first end of the third branch is connected to a second end of the first microstrip coupling line, and a first end of the fourth branch is connected to a second end of the second microstrip coupling line; and a second end of the third branch is connected with a second end of the fourth branch, or both the second end of the third branch and the second end of the fourth branch are connected with the ground layer through a via, or the second end of the third branch and the second end of the fourth branch are open-circuit. Here, no limit is made thereto in the embodiment of the present disclosure.

In an exemplary embodiment, the third branch and fourth branch may be "-" shaped branches, or the third branch and fourth branch may be "L" shaped branches. For example, taking an example that the second branch structure is an open-circuit branch structure, both the third branch and the fourth branch may be a "-" type branches extending along a first direction Y, and a first end of the third branch and a first end of the fourth branch are connected to a second end of the microstrip coupling line. For example, taking an example that the second branch structure is a closed branch structure as an example, both the third branch and the fourth branch may be "L" shaped branches extending along the first direction Y, the first end of the third branch and the first end of the fourth branch are connected to the second end of the microstrip coupling line, and a second end of the third branch is connected to a second end of the fourth branch. Here, no limit is made thereto in the embodiment of the present disclosure.

In an exemplary embodiment, the microstrip feed line may include, but is not limited to, a uniform impedance microstrip feed line or a step impedance microstrip feed line extending along a second direction X, the second direction X being perpendicular to the first direction Y. For example, the uniform impedance microstrip feed line may be a "-" shape extending along the second direction X. For example, the step impedance microstrip feed line may include a first feed line, a second feed line, and a third feed line which are connected sequentially along the second direction X, wherein a width of the second feed line is different from a width of the first feed line and a width of the third feed line. For example, the width of the second feed line is smaller than the width of the first feed line, and is smaller than the width of the third feed line. For example, the width of the second feed line is smaller than the width of the first feed line, and the width of the first feed line is equal to the width of the third feed line, wherein the width of the feed line refers to a dimensional characteristic along the first direction Y, the second direction X intersecting the first direction Y. Here, no limit is made thereto in the embodiment of the present disclosure.

In an exemplary embodiment, the microstrip feed line may include but is not limited to being made of at least one of a metallic material such as copper, gold or silver. In this way, the microstrip feed line has lower resistance, higher sensitivity of transmitted signal, less metal loss and longer service life.

In an exemplary embodiment, the shape of the radiation patch may be any one of an axisymmetric pattern such as a circle, an ellipse, a rectangle, or a diamond. For example, the shape of the radiation patch can be circular. Here, no limit is made thereto in the embodiment of the present disclosure.

In an exemplary embodiment, the dielectric substrate may satisfy any one or more of the following conditions: a dielectric constant (dk) of the dielectric substrate may be about 1.7 to 2.7, dielectric loss (df) of the dielectric substrate may be about 0.00072 to 0.00108, and a thickness of the dielectric substrate may be 0.4 mm (mm) to 0.6 mm. For example the dielectric substrate may be a lossy dielectric substrate whose dk/df may be about 2.2/0.0009 and whose thickness may be about 0.508 mm. Here, no limit is made thereto in the embodiment of the present disclosure. Among them, the dielectric loss (df) can also be called loss angle tangent value, dielectric loss angle tangent, dielectric loss factor or loss factor, etc.

In an exemplary embodiment, the dielectric substrate may be a rigid dielectric substrate or a flexible dielectric substrate. For example, taking the dielectric substrate as a rigid dielectric substrate, the dielectric substrate may include, but is not limited to, one of a rigid dielectric substrate such as an epoxy glass cloth (FR-4) laminate, a polytetrafluoroethylene glass fiber platen, a phenolic glass cloth laminate, or a glass substrate. In this way, the prepared antenna unit has the advantages of wide material sources, better stability, better insulation effect, low microwave loss, almost no influence on the transmission of radio signals or electromagnetic waves, better hardness, better antenna performance and the like. Here, FR-4 is the code name of a fire-resistant material grade. For another example, taking an example that the dielectric substrate is a flexible dielectric substrate, the dielectric substrate may include, but is not limited to, one of a flexible dielectric substrate made of a polymer material such as polyimide (PI), polyethylene terephthalate (PET), polyethylene naphthalate (PEN), or polycarbonate (PC). Thus, the prepared antenna unit has the advantages of wide material sources, better flexibility, lighter weight and better impact resistance. Therefore, when the antenna unit is applied to an electronic device, the limitation of the shape or size of the electronic device on the antenna unit can be reduced, and the antenna unit can be better integrated with other components of the electronic device.

In an exemplary embodiment, an antenna layer may include but is not limited to being made of at least one of a metallic material such as copper, gold or silver. For example, a microstrip feed line, a radiation patch, a microstrip coupling line, a first branch structure and a second branch structure in the antenna layer may be made of a copper material. In this way, the antenna layer has lower resistance, higher sensitivity of transmitted signal, less metal loss and longer service life.

In an exemplary embodiment, a thickness of the antenna layer may be about 0.144 mm to 0.216 mm. For example, the thickness of the antenna layer may be about 0.018 mm. Here, no limit is made thereto in the embodiment of the present disclosure.

In an exemplary embodiment, a ground layer may include but is not limited to being made of at least one of a metallic material such as copper, gold or silver. For example, the ground layer may be made of copper material. In this way, the ground layer has lower resistance, higher sensitivity of transmitted signal, less metal loss and longer service life.

In an exemplary embodiment, a thickness of the ground layer may be about 0.144 mm to 0.216 mm. For example, a thickness of the ground layer may be about 0.018 mm. Here, no limit is made thereto in the embodiment of the present disclosure.

In an exemplary embodiment, a thickness of the antenna unit may be about 0.144λ0 to 0.216λ0. For example, the thickness of the antenna unit may be about 0.018λ0. Among them, λ 0 represents the vacuum wavelength corresponding to the center frequency point f0 of the antenna unit, which may be about 10 GHz. Here, no limit is made thereto in the embodiment of the present disclosure.

In an exemplary embodiment, the antenna unit may be implemented as a differential microstrip filtering antenna.

The above-mentioned antenna unit will be described in detail below with an exemplary example in connection with the accompanying drawings.

Figure 2:
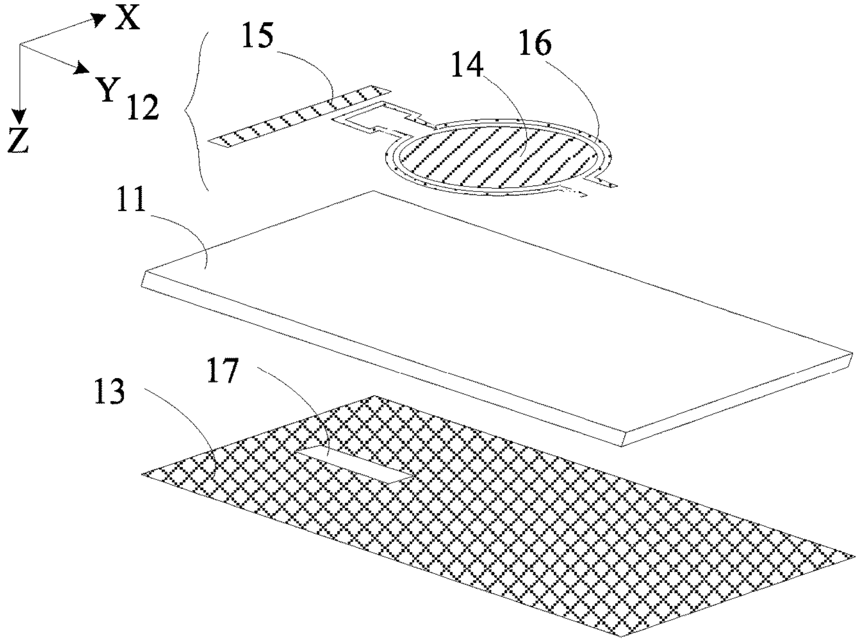
FIG. 2 is a schematic diagram of a first structure of the antenna unit in an exemplary embodiment of the present disclosure.
Figure 3:
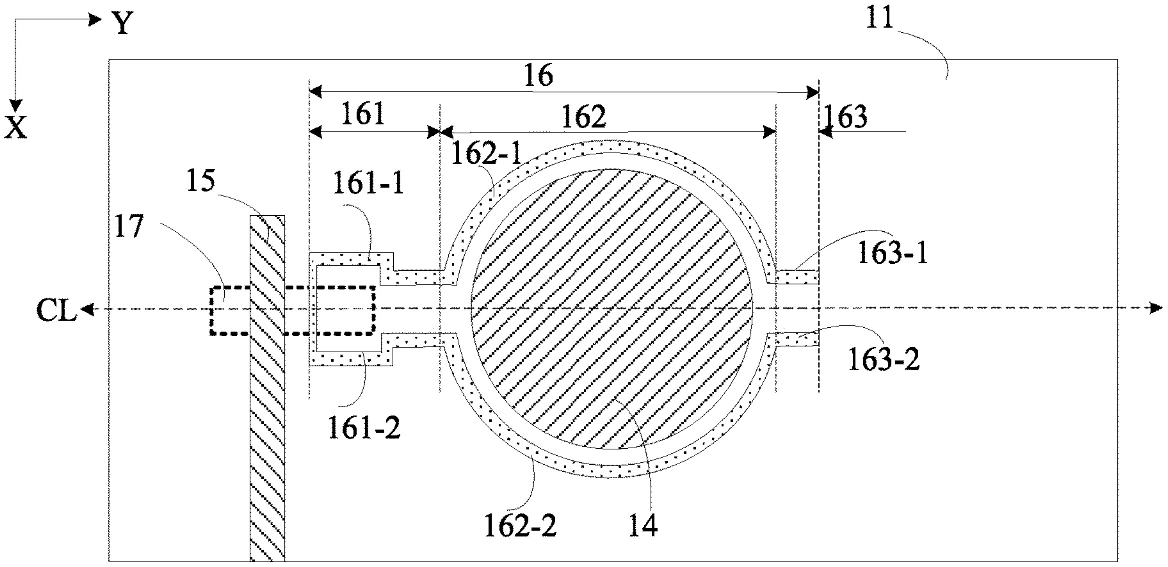
FIG. 3 is a schematic plan view of the antenna unit shown in FIG. 2.
Figure 4:
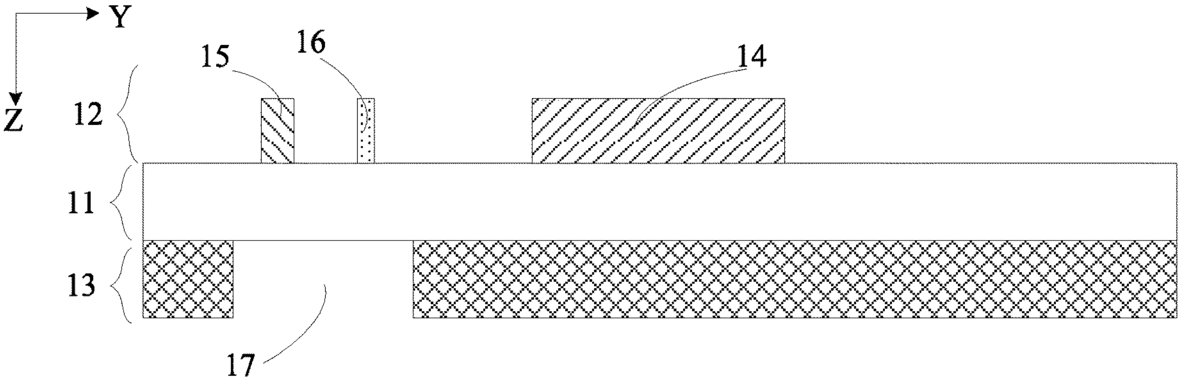
FIG. 4 is a schematic cross-sectional view of the antenna unit shown in FIG. 3 along the CL direction.

Embodiments of the present disclosure provide an antenna unit. FIG. 2 is a schematic diagram of a first structure of an antenna unit in an exemplary embodiment of the present disclosure, FIG. 3 is a schematic plan view of the antenna unit shown in FIG. 2, and FIG. 4 is a schematic diagram of a cross-section of the antenna unit shown in FIG. 3 along the CL direction. As shown in FIG. 2 to FIG. 4, in a direction perpendicular to the plane of the antenna unit (i.e., the third direction Z), the antenna unit may include a dielectric substrate 11, an antenna layer 12 located on a side of first surface of the dielectric substrate 11, and a ground layer 13 on a side of second surface of the dielectric substrate 11, wherein the first surface and the second surface are the two surfaces of the dielectric substrate facing away from each other, the antenna layer 12 may include a microstrip feed line 15, a radiation patch 14 located on a side of the microstrip feed line 15 along the first direction Y and a microstrip coupling line structure 16 that at least partially surrounds the radiation patch 14, and the ground layer 13 may include a floor groove 17. A spacing area is provided between the microstrip coupling line structure 16 and the microstrip feed line 15, an orthographic projection of the floor groove 17 on the dielectric substrate 11 partially overlaps with an orthographic projection of the microstrip feed line 15 on the dielectric substrate 11, and an orthographic projection of the floor groove 17 on the dielectric substrate 11 partially overlaps with an orthographic projection of an end of the microstrip coupling line structure 16 close to the microstrip feed line 15 on the dielectric substrate 11 in order that the floor groove, the microstrip coupling line structure and the microstrip feed line form a conversion structure, wherein the conversion structure is configured to enable a conversion between single-ended and differential signals, thus a hybrid electromagnetic coupling in the antenna unit and a better filtering function can be achieved. Among them, an electrical coupling path is mainly generated by a gap capacitance between the microstrip feed line and the microstrip coupling line structure, while an magnetic coupling path is mainly achieved by the floor groove, and the strengths and phases of the two coupling paths are all different. When the phases of the signals transmitted along the two paths are opposite, the magnetic coupling will be offset by the electrical coupling, thereby enabling the out-of-band suppression level of the antenna unit to be enhanced.

In an exemplary embodiment, as shown in FIG. 3, the microstrip coupling line structure 16 may include a microstrip coupling line 162, and a first branch structure 161 and a second branch structure 163 located on both sides of the microstrip coupling line 162 in the first direction Y, the first branch structure 161 may include a first branch 161-1 extending along the first direction Y and a second branch 161-2 extending along the first direction Y, the microstrip coupling line 162 may include a first microstrip coupling line 162-1 and a second microstrip coupling line 162-2, and the second branch structure 163 may include a third branch 163-1 extending along the first direction Y and a fourth branch 163-2 extending along the first direction Y, wherein a first end of the first branch 161-1 is connected to a first end of the second branch 161-2, a second end of the first branch 161-1 is connected to a first end of the first microstrip coupling line 162-1, a second end of the first microstrip coupling line 162-1 is connected to a first end of the third branch 163-1, a second end of the second branch 161-2 is connected to a first end of the second microstrip coupling line 162-2, and a second end of the second microstrip coupling line 162-2 is connected to a first end of the fourth branch 163-2. Here, FIG. 3 is a schematic illustration of taking an example that the second branch structure 163 is an open-circuit branch structure.

In an exemplary embodiment, as shown in FIG. 3, the first microstrip coupling line 162-1 and the second microstrip coupling line 162-2 may be symmetrically arranged on both sides of the center line CL of the dielectric substrate. For example, taking an example that a shape of the radiation patch 14 is a circular shape, the shapes of the first microstrip coupling line 162-1 and the second microstrip coupling line 162-2 may be arc-shaped. Here, no limit is made thereto in the embodiment of the present disclosure.

In an exemplary embodiment, as shown in FIG. 3, the first branch 161-1 and the second branch 161-2 may be symmetrically arranged on both sides of the center line CL of the dielectric substrate. For example, both the first branch 161-1 and the second branch 161-2 may include two "L" shaped branches connected sequentially. Here, no limit is made thereto in the embodiment of the present disclosure.

In an exemplary embodiment, as shown in FIG. 3, the third branch 163-1 and the fourth branch 163-2 may be symmetrically arranged on both sides of the center line CL of the dielectric substrate. For example, both the third branch 163-1 and the fourth branch 163-2 may be a "-" shaped branch extending along the first direction Y. Here, no limit is made thereto in the embodiment of the present disclosure.

In an exemplary embodiment, as shown in FIG. 3, the microstrip feed line 15 may be a uniform impedance microstrip feed line. For example, the microstrip feed line 15 may extend along the second direction X, and the shape of the microstrip feed line 15 may be a "-" shape. The second direction X crosses the first direction Y.

In an exemplary embodiment, as shown in FIG. 3, the floor groove 17 may extend in the first direction Y, and the shape of the floor groove 17 may be a "-" shape.

In an exemplary embodiment, as shown in FIG. 3, the shape of the radiation patch 14 may be circular.

FIG. 5A to FIG. 5D show simulation results of the antenna unit shown in FIG. 2 and the performance of the antenna unit shown in FIG. 2 will be described below in connection with the simulation results of the antenna unit.

Figure 5A:
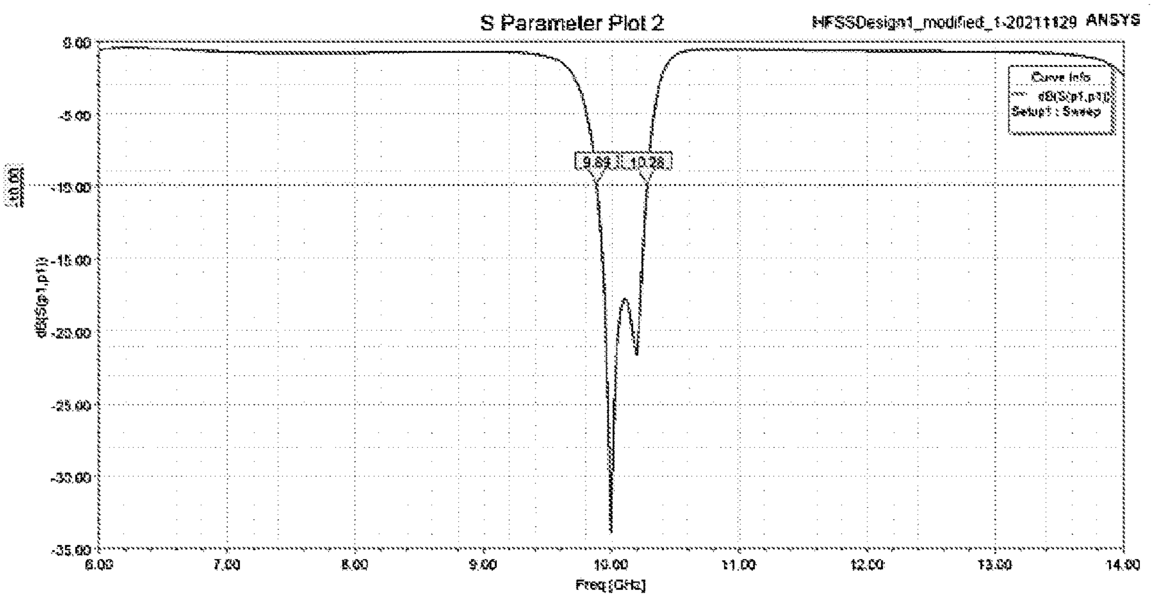
FIGS. 5A to 5D are schematic diagrams of simulation results of the antenna unit shown in FIG. 2.

FIG. 5A shows a reflection coefficient (S11 parameter) curve in the scattering parameter (S parameter) of the antenna unit shown in FIG. 2, as shown in FIG. 5A, a −10 dB (decibel) impedance bandwidth of this antenna unit is about 9.89 GHz (gigahertz) to 10.28 GHz, and the antenna unit exhibits a second-order filtered response characteristic.

Figure 5B:
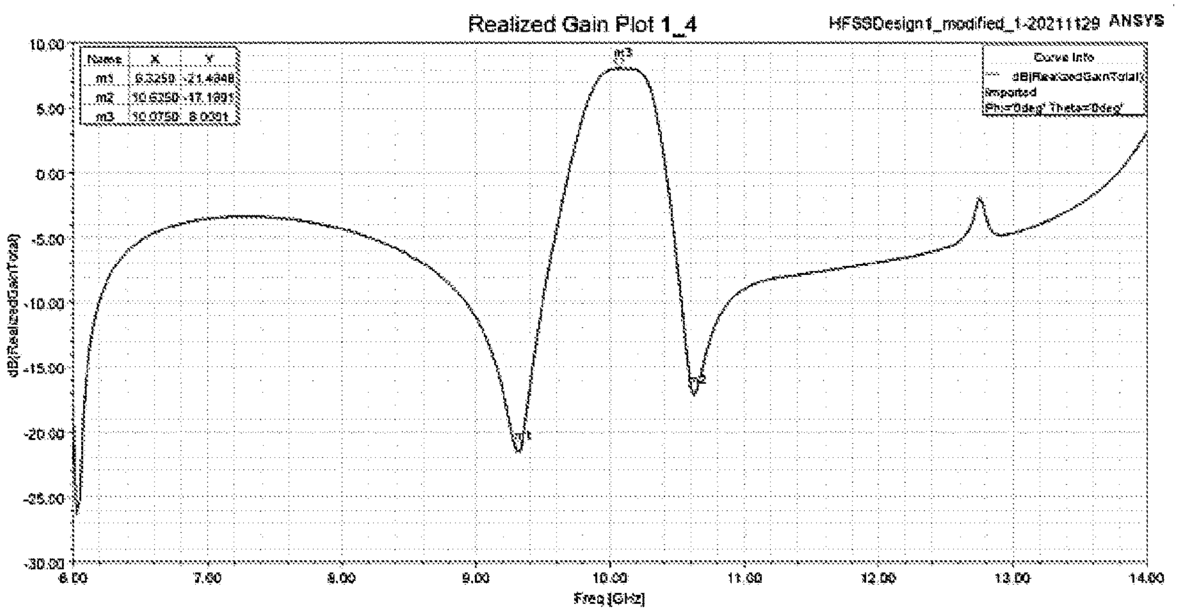

FIG. 5B shows a gain curve of the antenna unit shown in FIG. 2 which has a gain of about 8 dBi in the passband and has a good gain flatness in the passband as shown in FIG. 5B; the antenna unit respectively has a radiation zero point on the left side and right side of the passband, where the two radiation zero points are at 9.325 GHz and 10.625 GHz respectively; and the stop-band suppression of the antenna unit in the upper sideband is better than that in the lower sideband.

According to the electric field distribution of the antenna unit at the central frequency point (i.e. 10.075 GHz) and two radiation zero points (i.e. 9.325 GHz and 10.625 GHz) shown in FIG. 2, as well as the magnetic field distribution of the antenna unit at the center frequency point (i.e. 10.075 GHz) and two radiation zero points (i.e. 9.325 GHz and 10.625 GHz) shown in FIG. 2, it can be seen that the electric field of the antenna unit on the radiation patch at the center frequency point (i.e. 10.075 GHz) is very strong, while the field intensity of the radiation patch at the two radiation zero points (i.e. 9.325 GHz and 10.625 GHz) is very weak, and the antenna unit hardly radiates; and the magnetic coupling strength of the antenna unit at the upper zero point is weaker than that at the lower zero point, so the out-of-band suppression level of the antenna unit at the upper zero point is better than that at the lower zero point.

Figure 5C:
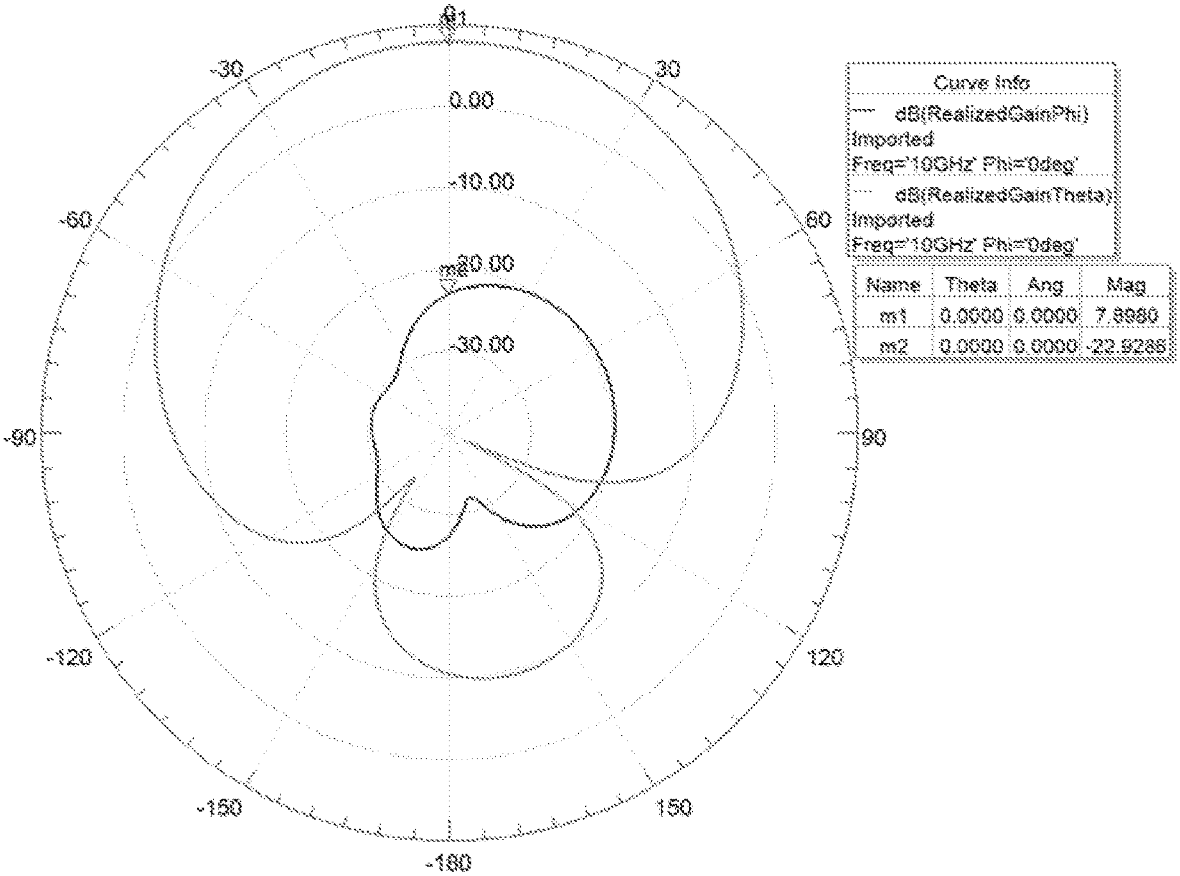
Figure 5D:
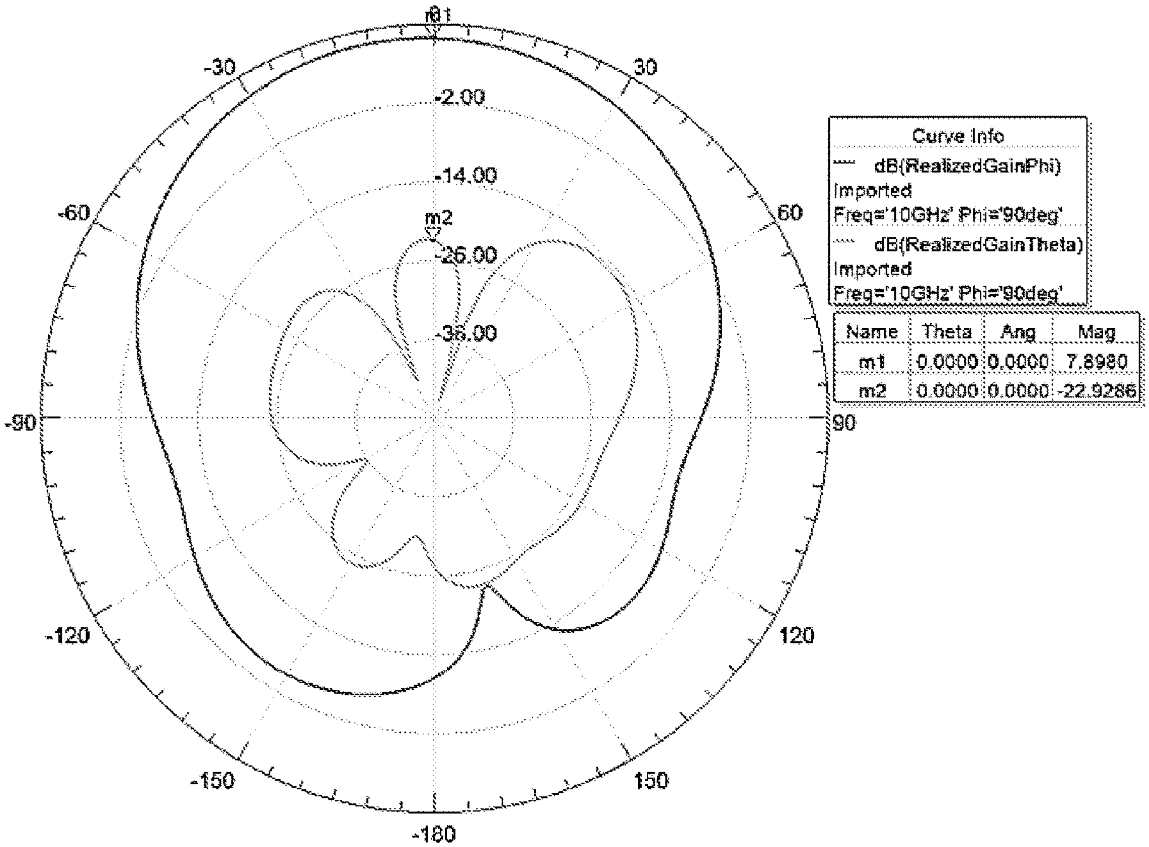

FIG. 5C to FIG. 5D show radiation patterns of the antenna unit shown in FIG. 2 in the E-plane and the H-plane, and as shown in FIG. 5C to FIG. 5D, the antenna unit within the passband has a low cross-polarization level and a stable radiation mode.

As can be seen from the above, in the antenna unit provided by the embodiments of the present disclosure, the floor groove, the microstrip coupling line structure and the microstrip feed line form a conversion structure by arranging a spacing area between the microstrip coupling line structure and the microstrip feed line, and by partly overlapping an orthographic projection of the floor groove on the dielectric substrate with an orthographic projection of the microstrip feed line on the dielectric substrate and partly overlapping an orthographic projection of the floor groove on the dielectric substrate with an orthographic projection of an end of the microstrip coupling line structure close to the microstrip feed line (i.e. a first branch structure in the microstrip coupling line structure) on the dielectric substrate. In this way, a conversion between the single-ended signal and the differential signal, a hybrid electromagnetic coupling in the antenna unit, and a better filtering function can be achieved by the conversion structure. Therefore, a fusion design of the antenna, the filter and the Balun is achieved by forming a conversion structure without introducing additional filtering circuit and loading complex parasitic structure, so that the antenna unit may have the characteristics of simple antenna structure, small size, low structural profile, low cost, easy to be processed and easy to be integrated with other modules, and ensuring excellent antenna performance.

Figure 6:
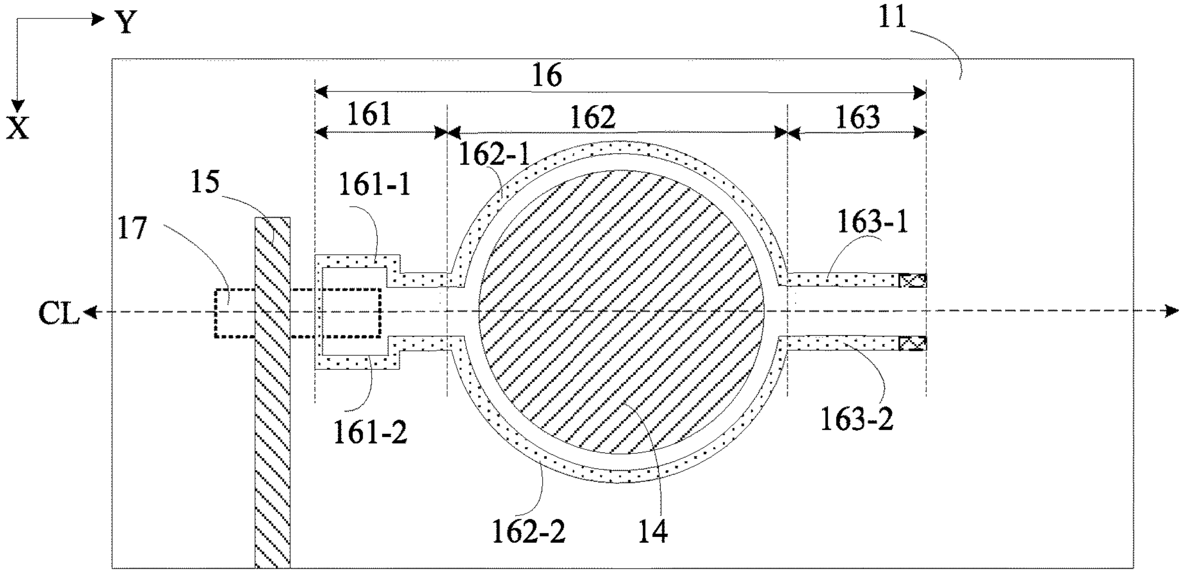
FIG. 6 is a schematic diagram of a second structure of the antenna unit in an exemplary embodiment of the present disclosure.

Embodiments of the present disclosure provide an antenna unit. FIG. 6 is a schematic diagram of a second structure of an antenna unit in an exemplary embodiment of the present disclosure, as shown in FIG. 6, in a direction perpendicular to the plane of the antenna unit (i.e., the third direction Z), the antenna unit may include a dielectric substrate 11, an antenna layer 12 located on a side of first surface of the dielectric substrate 11, and a ground layer 13 on a side of second surface of the dielectric substrate 11, wherein the first surface and the second surface are the two surfaces of the dielectric substrate facing away from each other, the antenna layer 12 may include a microstrip feed line 15, a radiation patch 14 located on a side of the microstrip feed line 15 along the first direction Y and a microstrip coupling line structure 16 that at least partially surrounds the radiation patch 14, and the ground layer 13 may include a floor groove 17. A spacing area is provided between the microstrip coupling line structure 16 and the microstrip feed line 15, an orthographic projection of the floor groove 17 on the dielectric substrate 11 partially overlaps with an orthographic projection of the microstrip feed line 15 on the dielectric substrate 11, and an orthographic projection of the floor groove 17 on the dielectric substrate 11 partially overlaps with an orthographic projection of an end of the microstrip coupling line structure 16 close to the microstrip feed line 15 on the dielectric substrate 11 in order that a conversion structure is formed, so that a conversion between single-ended and differential signals, a hybrid electromagnetic coupling in the antenna unit, and a better filtering function can be achieved.

In an exemplary embodiment, as shown in FIG. 6, the microstrip coupling line structure 16 may include a microstrip coupling line 162, and a first branch structure 161 and a second branch structure 163 connected to the microstrip coupling line 162, wherein the first branch structure 161 and the second branch structure 163 are located on both sides of the microstrip coupling line 162 along the first direction Y, and the first branch structure 161 is a closed branch structure and the second branch structure 163 is a short-circuit branch structure. Among them, a second end of the first branch structure 161 is connected to a first end of the microstrip coupling line 162, a second end of the microstrip coupling line 162 is connected to a first end of the second branch structure 163, and a second end of the second branch structure 163 is connected to a ground layer 13 through a via.

In an exemplary embodiment, as shown in FIG. 6, the first branch structure 161 may include a first branch 161-1 extending along the first direction Y and a second branch 161-2 extending along the first direction Y, wherein the first branch 161-1 and the second branch 161-2 may be symmetrically arranged on both sides of the center line CL of the dielectric substrate. For example, both the first branch 161-1 and the second branch 161-2 may include two "L" shaped branches connected sequentially. Here, no limit is made thereto in the embodiment of the present disclosure.

In an exemplary embodiment, as shown in FIG. 6, the microstrip coupling line 162 may include a first microstrip coupling line 162-1 and a second microstrip coupling line 162-2, which may be symmetrically arranged on both sides of the center line CL of the dielectric substrate. For example, taking an example that a shape of the radiation patch 14 is a circular shape, the shapes of the first microstrip coupling line 162-1 and the second microstrip coupling line 162-2 may be arc-shaped. Here, no limit is made thereto in the embodiment of the present disclosure.

In an exemplary embodiment, as shown in FIG. 6, the second branch structure 163 may include a third branch 163-1 extending along the first direction Y and a fourth branch 163-2 extending along the first direction Y. The third branch 163-1 and the fourth branch 163-2 may be symmetrically arranged on both sides of the center line CL of the dielectric substrate. For example, both the third branch 163-1 and the fourth branch 163-2 may be a "-" shaped branch extending along the first direction Y. Here, no limit is made thereto in the embodiment of the present disclosure.

In an exemplary embodiment, as shown in FIG. 6, a first end of the first branch 161-1 is connected to a first end of the second branch 161-2, a second end of the first branch 161-1 is connected to a first end of the first microstrip coupling line 162-1, a second end of the first microstrip coupling line 162-1 is connected to a first end of the third branch 163-1, a second end of the second branch 161-2 is connected to a first end of the second microstrip coupling line 162-2, a second end of the second microstrip coupling line 162-2 is connected to a first end of the fourth branch 163-2, a second end of the third branch 163-1 is connected to a ground layer 13 through a via, and a second end of the fourth branch 163-2 is connected to a ground layer 13 through a via.

In an exemplary embodiment, as shown in FIG. 6, the microstrip feed line 15 may be a uniform impedance microstrip feed line. For example, the microstrip feed line 15 may extend along the second direction X, and the shape of the microstrip feed line 15 may be a "-" shape. The second direction X crosses the first direction Y.

In an exemplary embodiment, as shown in FIG. 6, the floor groove 17 may extend in the first direction Y, and the shape of the floor groove 17 may be a "-" shape.

In an exemplary embodiment, as shown in FIG. 6, the shape of the radiation patch 14 may be circular.

FIG. 7A to FIG. 7D show simulation results of the antenna unit shown in FIG. 6 and the performance of the antenna unit shown in FIG. 6 will be described below in connection with the simulation results of the antenna unit.

Figure 7A:
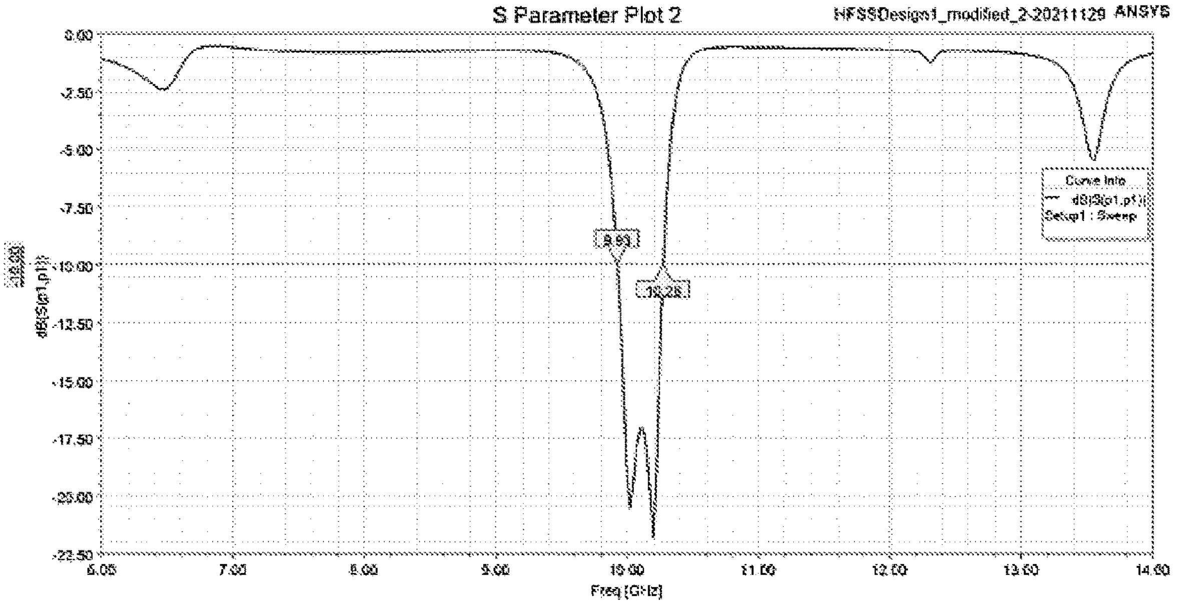
FIGS. 7A to 7D are schematic diagrams of simulation results of the antenna unit shown in FIG. 6.

FIG. 7A shows a reflection coefficient (S11 parameter) curve in the scattering parameter (S parameter) of the antenna unit shown in FIG. 6, as shown in FIG. 7A, a −10 dB (decibel) impedance bandwidth of this antenna unit is about 9.93 GHZ (gigahertz) to 10.28 GHz, and the antenna unit exhibits a second-order filtering response characteristic.

Figure 7B:
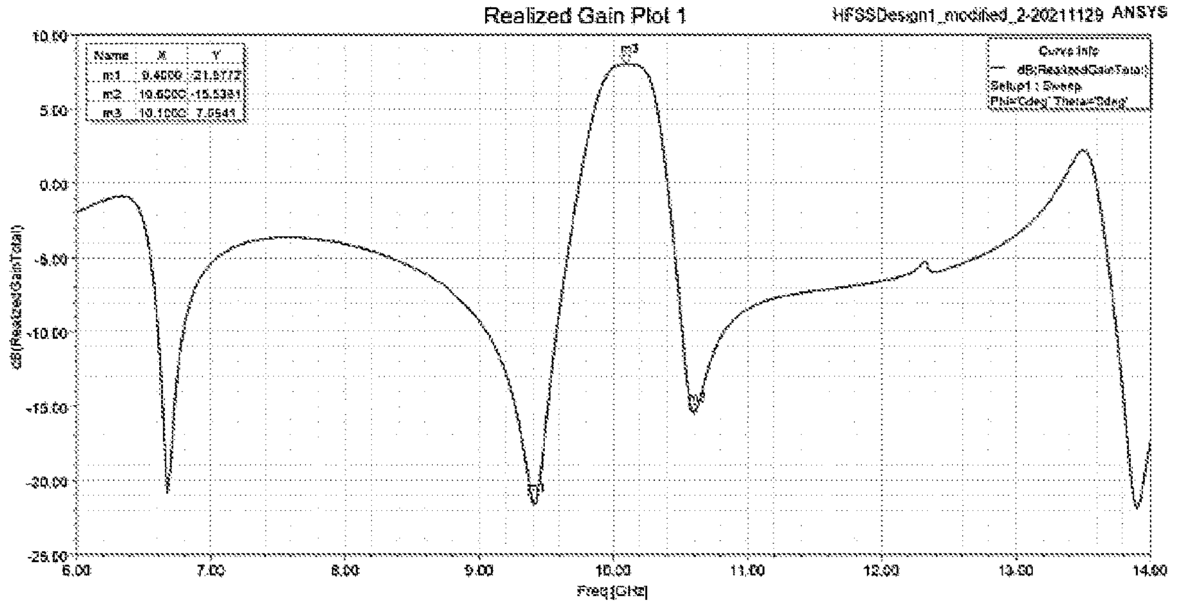

FIG. 7B shows a gain curve of the antenna unit shown in FIG. 6, which has a gain of about 8 dBi in the passband and has a good gain flatness in the passband as shown in FIG. 7B; the antenna unit has a radiation zero point on the left side and right side of the passband respectively, where the two radiation zero points are at 9.4 GHz and 10.6 GHz respectively; and the stop-band suppression of the antenna unit in the upper sideband is better than that in the lower sideband.

According to the electric field distribution of the antenna unit at the central frequency point (i.e. 10.1 GHZ) and two radiation zero points (i.e. 9.4 GHz and 10.6 GHz) shown in FIG. 6, as well as the magnetic field distribution of the antenna unit at the center frequency point (i.e. 10.1 GHZ) and two radiation zero points (i.e. 9.4 GHz and 10.6 GHz) shown in FIG. 6, it can be seen that the electric field of the antenna unit on the radiation patch at the center frequency point (i.e. 10.1 GHZ) is very strong, while the field intensity of the radiation patch at the two radiation zeros (i.e. 9.4 GHz and 10.6 GHz) is very weak, and the antenna unit hardly radiates; and the magnetic coupling strength of the antenna unit at the upper zero point is weaker than that at the lower zero point, so the out-of-band suppression level of the antenna unit at the upper zero point is better than that at the lower zero point.

Figure 7C:
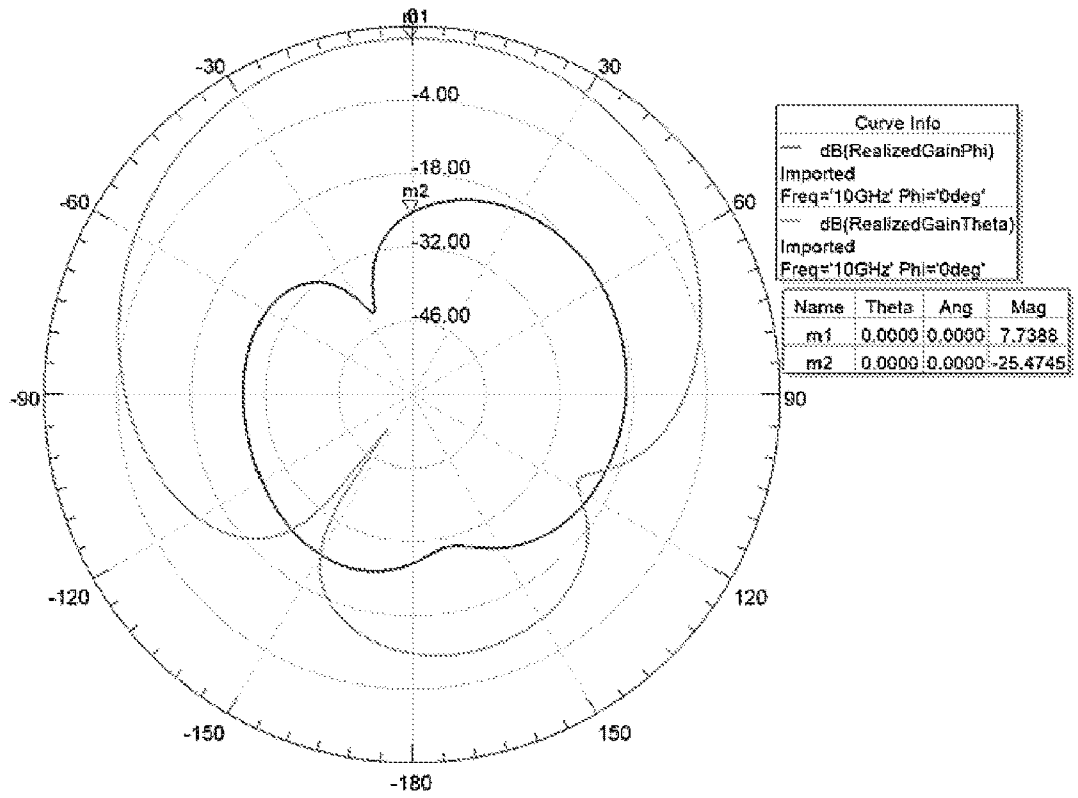
Figure 7D:
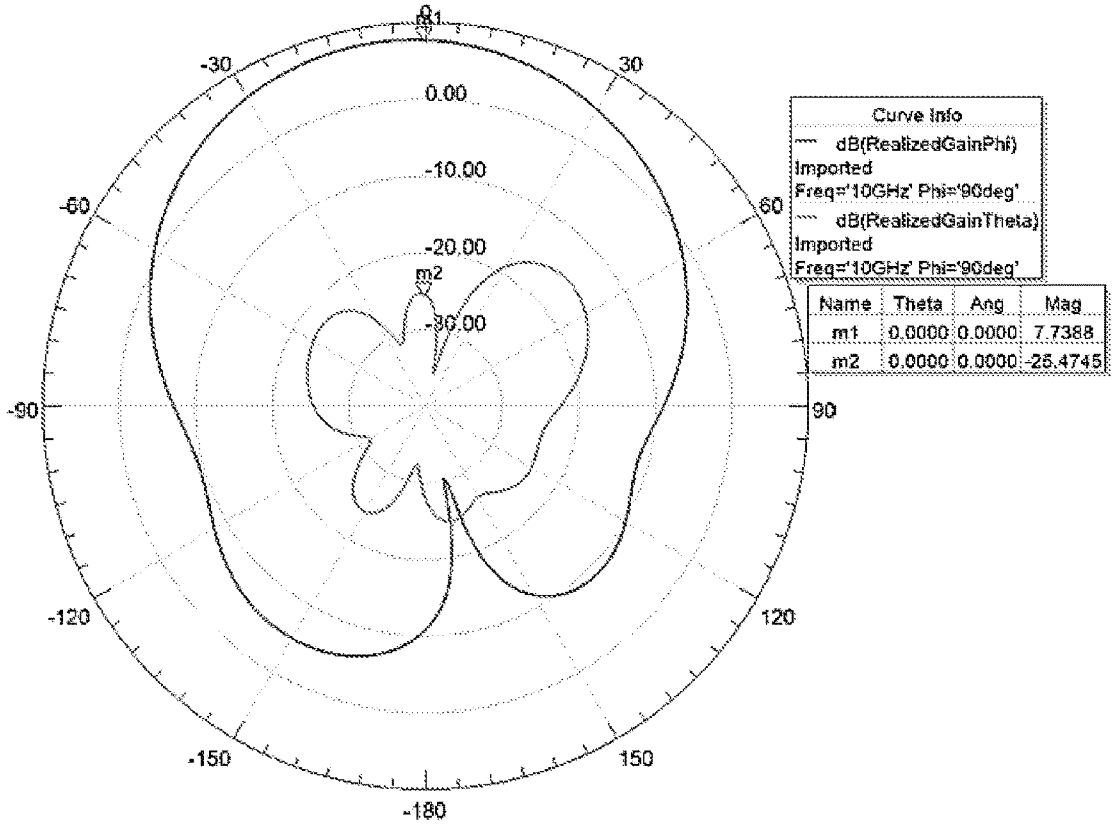

FIG. 7C to FIG. 7D show radiation patterns of the antenna unit shown in FIG. 6 in the E-plane and the H-plane, and as shown in FIG. 7C to FIG. 7D, the antenna unit within the passband has a low cross-polarization level and a stable radiation mode.

As can be seen from the above, in the antenna unit provided by the embodiments of the present disclosure, the floor groove, the microstrip coupling line structure and the microstrip feed line form a conversion structure by arranging a spacing area between the microstrip coupling line structure and the microstrip feed line, and by partly overlapping an orthographic projection of the floor groove on the dielectric substrate with an orthographic projection of the microstrip feed line on the dielectric substrate and partly overlapping an orthographic projection of the floor groove on the dielectric substrate with an orthographic projection of an end of the microstrip coupling line structure close to the microstrip feed line (i.e. a first branch structure in the microstrip coupling line structure) on the dielectric substrate. In this way, a conversion between the single-ended signal and the differential signal, a hybrid electromagnetic coupling in the antenna unit, and a better filtering function can be achieved by the conversion structure. Therefore, a fusion design of the antenna, the filter and the Balun is achieved by forming a conversion structure without introducing additional filtering circuit and loading complex parasitic structure, so that the antenna unit may have the characteristics of simple antenna structure, small size, low structural profile, low cost, easy to be processed and easy to be integrated with other modules, and ensuring excellent antenna performance.

Figure 8:
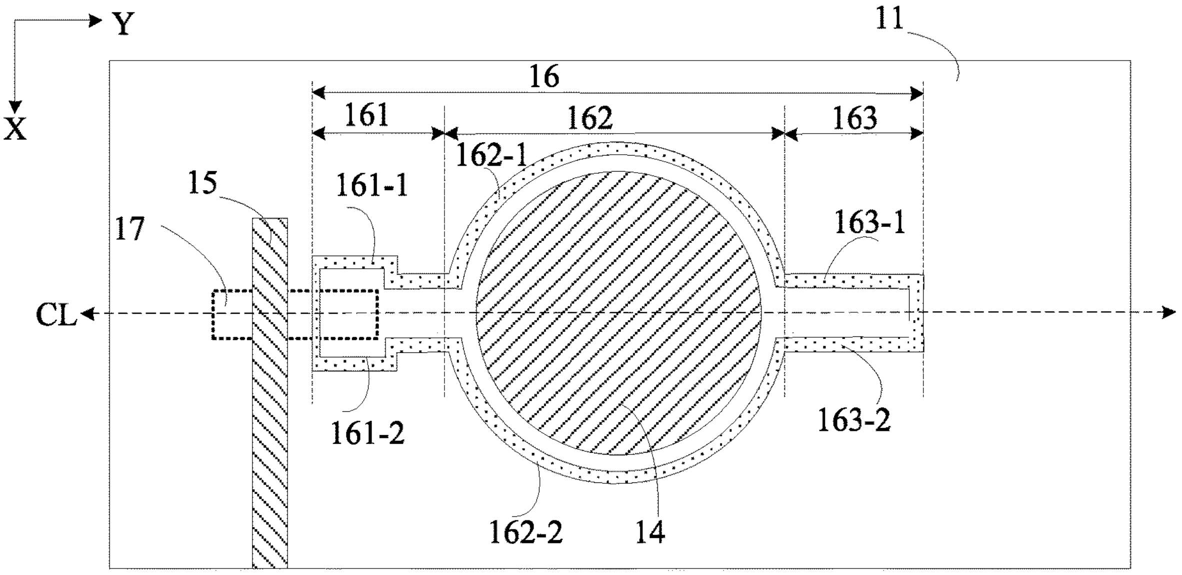
FIG. 8 is a schematic diagram of a third structure of the antenna unit in an exemplary embodiment of the present disclosure.

Embodiments of the present disclosure provide an antenna unit. FIG. 8 is a schematic diagram of a third structure of an antenna unit in an exemplary embodiment of the present disclosure, as shown in FIG. 8, in a direction perpendicular to the plane of the antenna unit (i.e., the third direction Z), the antenna unit may include a dielectric substrate 11, an antenna layer 12 located on a side of first surface of the dielectric substrate 11, and a ground layer 13 on a side of second surface of the dielectric substrate 11, wherein the first surface and the second surface are the two surfaces of the dielectric substrate facing away from each other, the antenna layer 12 may include a microstrip feed line 15, a radiation patch 14 located on a side of the microstrip feed line 15 along the first direction Y and a microstrip coupling line structure 16 that at least partially surrounds the radiation patch 14, and the ground layer 13 may include a floor groove 17. A spacing area is provided between the microstrip coupling line structure 16 and the microstrip feed line 15, an orthographic projection of the floor groove 17 on the dielectric substrate 11 partially overlaps with an orthographic projection of the microstrip feed line 15 on the dielectric substrate 11, and an orthographic projection of the floor groove 17 on the dielectric substrate 11 partially overlaps with an orthographic projection of an end of the microstrip coupling line structure 16 close to the microstrip feed line 15 on the dielectric substrate 11 in order that a conversion structure is formed, which enables a conversion between single-ended and differential signals, a hybrid electromagnetic coupling in the antenna unit, and a better filtering function to be achieved.

In an exemplary embodiment, as shown in FIG. 8, the microstrip coupling line structure 16 may include a microstrip coupling line 162, and a first branch structure 161 and a second branch structure 163 connected to the microstrip coupling line 162, wherein the first branch structure 161 and the second branch structure 163 are respectively located on both sides of the microstrip coupling line 162 along the first direction Y, and the first branch structure 161 is a closed branch structure and the second branch structure 163 is a closed branch structure. Among them, a second end of the first branch structure 161 is connected to a first end of the microstrip coupling line 162, and a second end of the microstrip coupling line 162 is connected to a first end of the second branch structure 163.

In an exemplary embodiment, as shown in FIG. 8, the first branch structure 161 may include a first branch 161-1 extending along the first direction Y and a second branch 161-2 extending along the first direction Y, wherein the first branch 161-1 and the second branch 161-2 may be symmetrically arranged on both sides of the center line CL of the dielectric substrate. For example, both the first branch 161-1 and the second branch 161-2 may include two "L" shaped branches connected sequentially. Here, no limit is made thereto in the embodiment of the present disclosure.

In an exemplary embodiment, as shown in FIG. 8, the microstrip coupling line 162 may include a first microstrip coupling line 162-1 and a second microstrip coupling line 162-2, which may be symmetrically arranged on both sides of the center line CL of the dielectric substrate respectively. For example, taking an example that a shape of the radiation patch 14 is a circular shape, the shapes of the first microstrip coupling line 162-1 and the second microstrip coupling line 162-2 may be arc-shaped. Here, no limit is made thereto in the embodiment of the present disclosure.

In an exemplary embodiment, as shown in FIG. 8, the second branch structure 163 may include a third branch 163-1 extending along the first direction Y and a fourth branch 163-2 extending along the first direction Y. The third branch 163-1 and the fourth branch 163-2 may be symmetrically arranged on both sides of the center line CL of the dielectric substrate respectively. For example, both the third branch 163-1 and the fourth branch 163-2 may be a "L" shaped branch extending along the first direction Y. Here, no limit is made thereto in the embodiment of the present disclosure.

In an exemplary embodiment, as shown in FIG. 8, a first end of the first branch 161-1 is connected to a first end of the second branch 161-2, a second end of the first branch 161-1 is connected to a first end of the first microstrip coupling line 162-1, a second end of the first microstrip coupling line 162-1 is connected to a first end of the third branch 163-1, a second end of the second branch 161-2 is connected to a first end of the second microstrip coupling line 162-2, a second end of the second microstrip coupling line 162-2 is connected to a first end of the fourth branch 163-2, and a second end of the third branch 163-1 is connected to a second end of the fourth branch 163-2.

In an exemplary embodiment, as shown in FIG. 8, the microstrip feed line 15 may be a uniform impedance microstrip feed line. For example, the microstrip feed line 15 may extend along the second direction X, and the shape of the microstrip feed line 15 may be a "-" shape. The second direction X crosses the first direction Y.

In an exemplary embodiment, as shown in FIG. 8, the floor groove 17 may be a rectangular groove, and for example, the floor groove 17 may extend in the first direction Y and the shape of the floor groove 17 may be a "-" shape.

In an exemplary embodiment, as shown in FIG. 8, the shape of the radiation patch 14 may be circular.

FIG. 9A to FIG. 9D show simulation results of the antenna unit shown in FIG. 8 and the performance of the antenna unit shown in FIG. 8 will be described below in connection with the simulation results of the antenna unit.

Figure 9A:
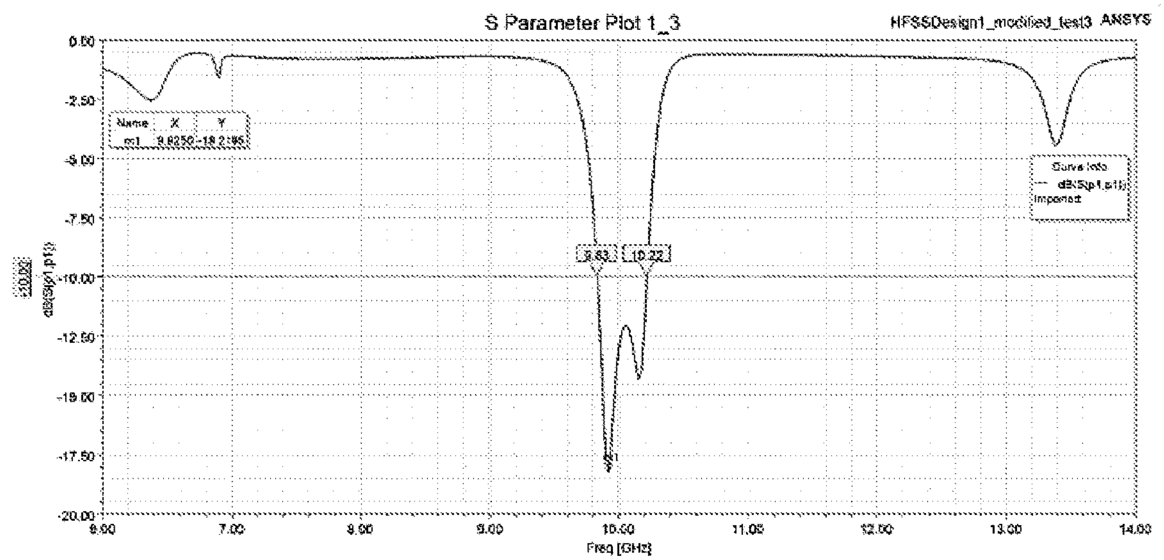
FIGS. 9A to 9D are schematic diagrams of simulation results of the antenna unit shown in FIG. 8.

FIG. 9A shows a reflection coefficient (S11 parameter) curve in the scattering parameter (S parameter) of the antenna unit shown in FIG. 8, as shown in FIG. 9A, a −10 dB (decibel) impedance bandwidth of this antenna unit is about 9.83 GHz (gigahertz) to 10.22 GHz, and the antenna unit exhibits a second-order filtering response characteristic.

Figure 9B:
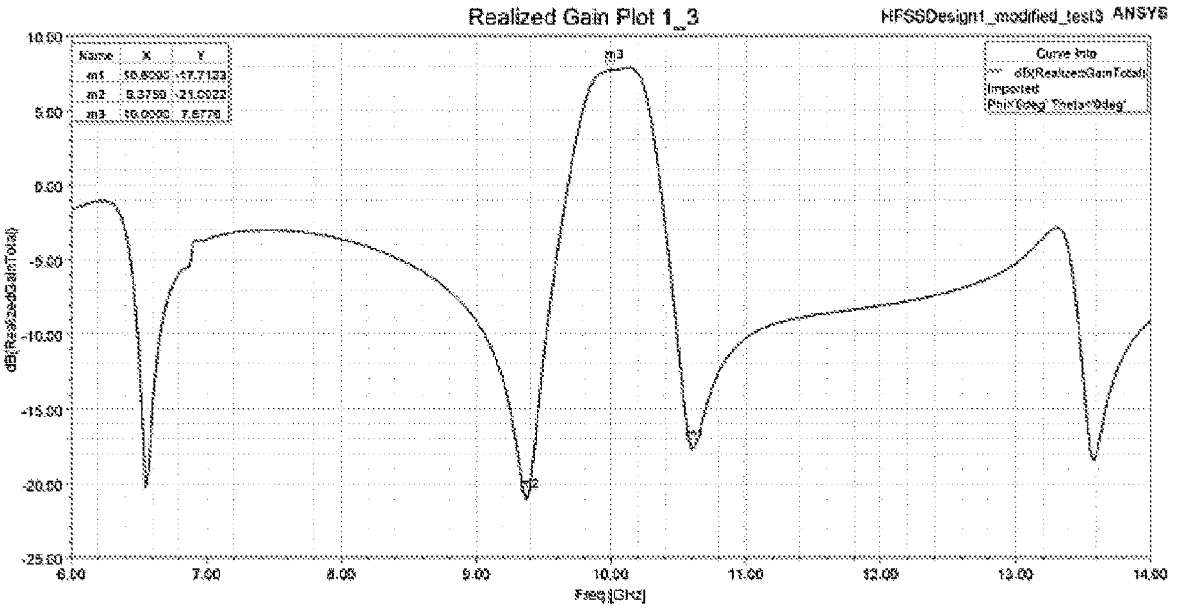

FIG. 9B shows a gain curve of the antenna unit shown in FIG. 8 which has a gain of about 8 dBi in the passband and has a good gain flatness in the passband as shown in FIG. 9B; the antenna unit has a radiation zero point on the left side and right side of the passband respectively, where the two radiation zero points are at 9.375 GHz and 10.6 GHz respectively; and the stop-band suppression of the antenna unit in the upper sideband is better than that in the lower sideband.

According to the electric field distribution of the antenna unit at the central frequency point (i.e. 10.0 GHz) and two radiation zero points (i.e. 9.375 GHz and 10.6 GHz) shown in FIG. 8, as well as the magnetic field distribution of the antenna unit at the center frequency point (i.e. 10.0 GHz) and two radiation zero points (i.e. 9.375 GHz and 10.6 GHz) shown in FIG. 8, it can be seen that the electric field of the antenna unit on the radiation patch at the center frequency point (i.e. 10.0 GHz) is very strong, while the field intensity of the radiation patch at the two radiation zero points (i.e. 9.375 GHz and 10.6 GHz) is very weak, and the antenna unit hardly radiates; and the magnetic coupling strength of the antenna unit at the upper zero point is weaker than that at the lower zero point, so the out-of-band suppression level of the antenna unit at the upper zero point is better than that at the lower zero point.

Figure 9C:
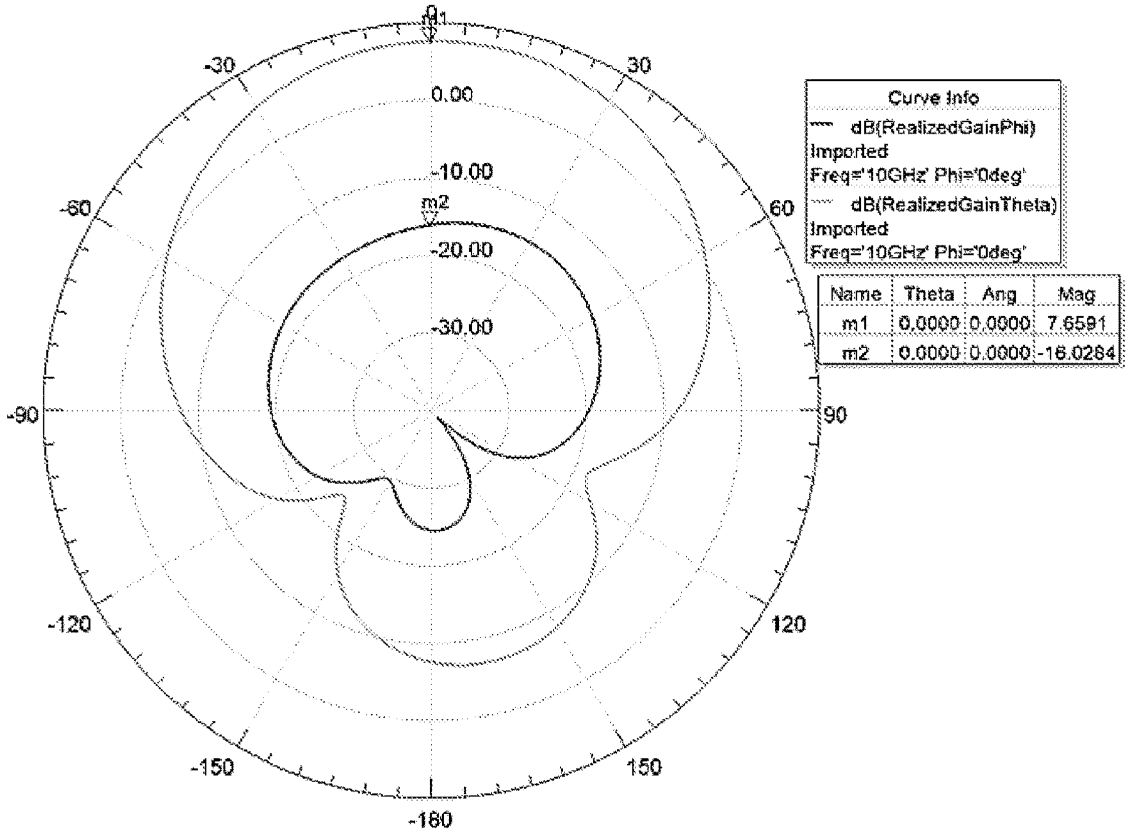
Figure 9D:
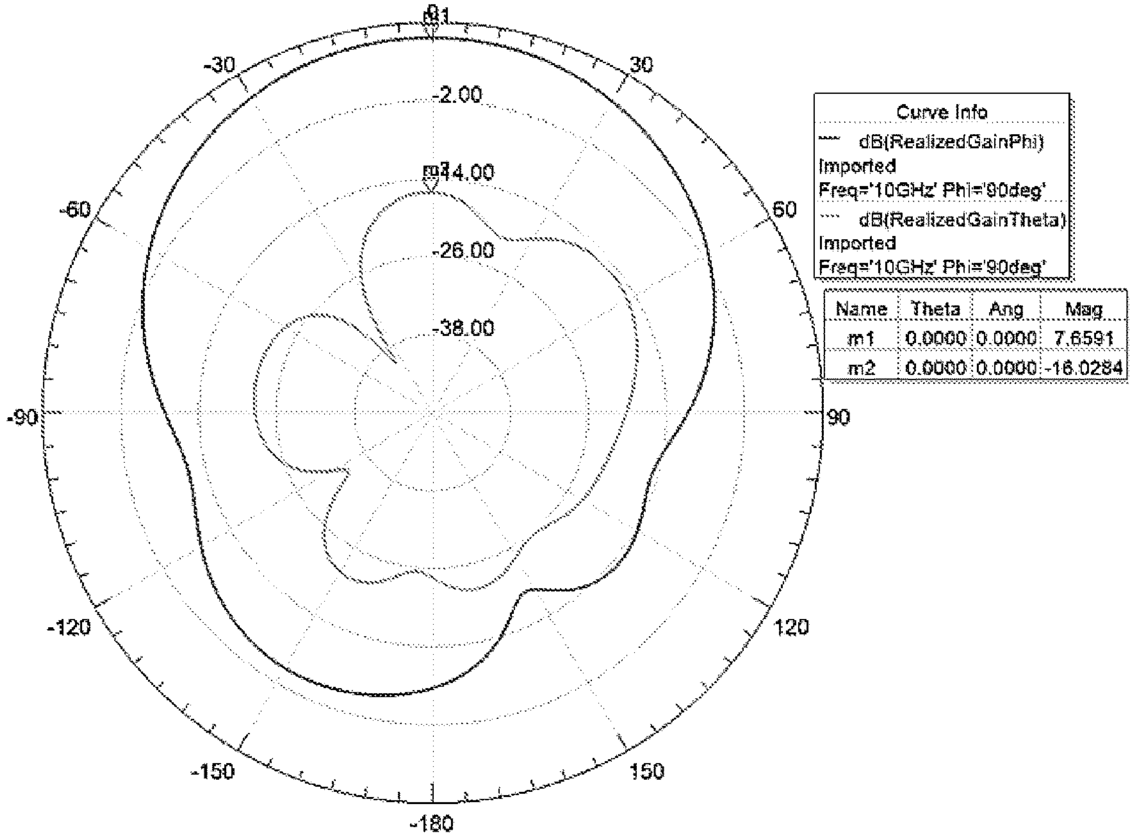

FIG. 9C to FIG. 9D show radiation patterns of the antenna unit shown in FIG. 8 in the E-plane and the H-plane, and as shown in FIG. 9C to FIG. 9D, the antenna unit within the passband has a low cross-polarization level and a stable radiation mode.

As can be seen from the above, in the antenna unit provided by the embodiments of the present disclosure, the floor groove, the microstrip coupling line structure and the microstrip feed line form a conversion structure by arranging a spacing area between the microstrip coupling line structure and the microstrip feed line, and by partly overlapping an orthographic projection of the floor groove on the dielectric substrate with an orthographic projection of the microstrip feed line on the dielectric substrate and partly overlapping an orthographic projection of the floor groove on the dielectric substrate with an orthographic projection of an end of the microstrip coupling line structure close to the microstrip feed line (i.e. a first branch structure in the microstrip coupling line structure) on the dielectric substrate. In this way, a conversion between the single-ended signal and the differential signal, a hybrid electromagnetic coupling in the antenna unit, and a better filtering function can be achieved by the conversion structure. Therefore, a fusion design of the antenna, the filter and the Balun is achieved by forming a conversion structure without introducing additional filtering circuit and loading complex parasitic structure, thereby the antenna unit having the characteristics of simple antenna structure, small size, low structural profile, low cost, easy to be processed and easy to be integrated with other modules, and ensuring excellent antenna performance.

Figure 10:
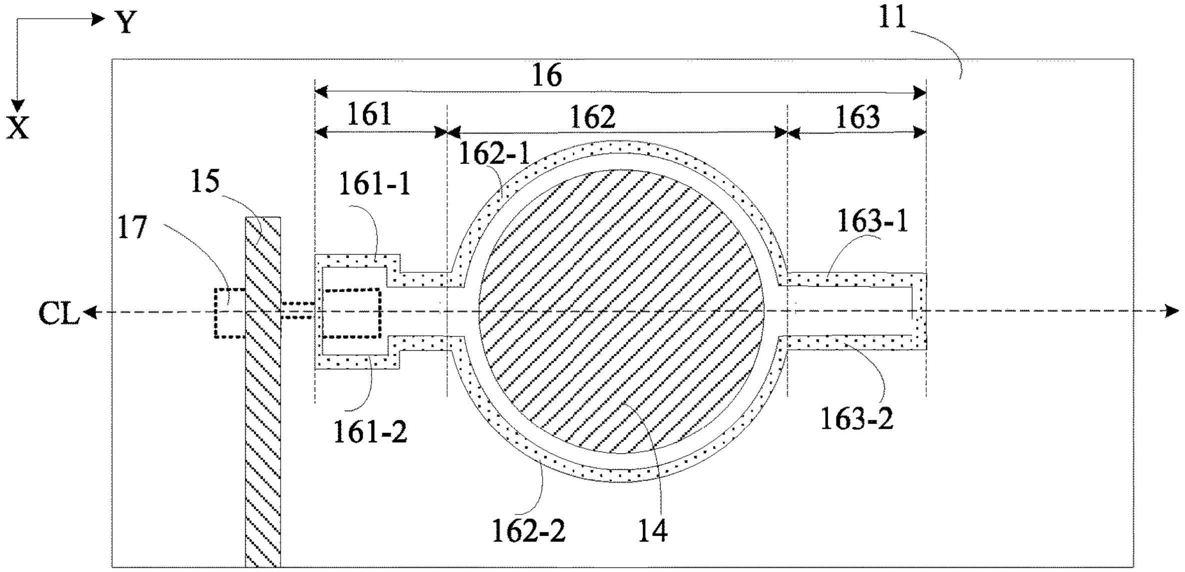
FIG. 10 is a schematic diagram of a fourth structure of the antenna unit in an exemplary embodiment of the present disclosure.

Embodiments of the present disclosure provide an antenna unit. FIG. 10 is a schematic diagram of a fourth structure of an antenna unit in an exemplary embodiment of the present disclosure, and as shown in FIG. 10, the antenna unit may include a dielectric substrate 11, an antenna layer 12 located on a side of a first surface of the dielectric substrate 11, and a ground layer 13 located on a side of a second surface of the dielectric substrate 11 in a direction perpendicular to a plane of the antenna unit (i.e., a third direction Z). Among them, the first surface and the second surface are the two surfaces of the dielectric substrate facing away from each other, the antenna layer 12 may include a microstrip feed line 15, a radiation patch 14 located on a side of the microstrip feed line 15 along the first direction Y and a microstrip coupling line structure 16 that at least partially surrounds the radiation patch 14, and the ground layer 13 may include a floor groove 17. A spacing area is provided between the microstrip coupling line structure 16 and the microstrip feed line 15, an orthographic projection of the floor groove 17 on the dielectric substrate 11 partially overlaps with an orthographic projection of the microstrip feed line 15 on the dielectric substrate 11, and an orthographic projection of the floor groove 17 on the dielectric substrate 11 partially overlaps with an orthographic projection of an end of the microstrip coupling line structure 16 close to the microstrip feed line 15 on the dielectric substrate 11 in order that a conversion structure is formed, which allows a conversion between single-ended and differential signals, a hybrid electromagnetic coupling in the antenna unit, and a better filtering function.

In an exemplary embodiment, as shown in FIG. 10, the floor groove 17 may extend in the first direction Y, and the shape of the floor groove 17 may be a "H" shape. For example, the floor groove 17 may include a first groove, a second groove, and a third groove arranged sequentially along the first direction Y, wherein a width of the second groove is different from a width of the first groove and a width of the third groove. For example, the width of the second groove is smaller than the width of the first groove, and is smaller than the width of the third groove. For example, a width of the first groove is equal to the width of the third groove. Among them, the width of the groove refers to a dimensional characteristic along the second direction X. Among them, the second direction X crosses the first direction Y. Here, no limit is made thereto in the embodiment of the present disclosure.

In an exemplary embodiment, as shown in FIG. 10, the shape of the radiation patch 14 may be circular.

In an exemplary embodiment, as shown in FIG. 10, the microstrip feed line 15 may be a uniform impedance microstrip feed line. For example, the microstrip feed line 15 may extend along the second direction X, and the microstrip feed line 15 may have a "-" shape. The second direction X crosses the first direction Y.

In an exemplary embodiment, as shown in FIG. 10, the microstrip coupling line structure 16 may include a microstrip coupling line 162, and a first branch structure 161 and a second branch structure 163 connected to the microstrip coupling line 162, wherein the first branch structure 161 and the second branch structure 163 are located on both sides of the microstrip coupling line 162 along the first direction Y respectively, and the first branch structure 161 has a closed branch structure and the second branch structure 163 has a closed branch structure. Among them, a second end of the first branch structure 161 is connected to a first end of the microstrip coupling line 162, and a second end of the microstrip coupling line 162 is connected to a first end of the second branch structure 163.

In an exemplary embodiment, as shown in FIG. 10, the first branch structure 161 may have an axisymmetric structure and a symmetry axis of the first branch structure 161 may be the center line CL of the dielectric substrate. For example, the first branch structure 161 may include a first branch 161-1 extending along the first direction Y and a second branch 161-2 extending along the first direction Y, wherein the first branch 161-1 and the second branch 161-2 may be symmetrically arranged on both sides of the center line CL of the dielectric substrate. For example, both the first branch 161-1 and the second branch 161-2 may include two "L" shaped branches connected sequentially. Here, no limit is made thereto in the embodiment of the present disclosure.

In an exemplary embodiment, as shown in FIG. 10, the microstrip coupling lines 162 may be an axisymmetric structure, and the symmetry axis of the microstrip coupling lines 162 may be the center line CL of the dielectric substrate. For example, the microstrip coupling line 162 may include a first microstrip coupling line 162-1 and a second microstrip coupling line 162-2, which may be symmetrically arranged on both sides of the center line CL of the dielectric substrate. For example, taking an example that a shape of the radiation patch 14 is a circular shape, the first microstrip coupling line 162-1 and the second microstrip coupling line 162-2 may be in an arc-shaped. Here, no limit is made thereto in the embodiment of the present disclosure.

In an exemplary embodiment, as shown in FIG. 10, the second branch structure 163 may be an axisymmetric structure and a symmetry axis of the second branch structure 163 may be the center line CL of the dielectric substrate. For example, the second branch structure 163 may include a third branch 163-1 extending along the first direction Y and a fourth branch 163-2 extending along the first direction Y, wherein the third branch 163-1 and the fourth branch 163-2 may be symmetrically arranged on both sides of the center line CL of the dielectric substrate. For example, both the third branch 163-1 and the fourth branch 163-2 may be branch in a "L" shaped extending along the first direction Y. Here, no limit is made thereto in the embodiment of the present disclosure.

In an exemplary embodiment, as shown in FIG. 10, a first end of the first branch 161-1 is connected to a first end of the second branch 161-2, a second end of the first branch 161-1 is connected to a first end of the first microstrip coupling line 162-1, a second end of the first microstrip coupling line 162-1 is connected to a first end of the third branch 163-1, a second end of the second branch 161-2 is connected to a first end of the second microstrip coupling line 162-2, a second end of the second microstrip coupling line 162-2 is connected to a first end of the fourth branch 163-2, and a second end of the third branch 163-1 is connected to a second end of the fourth branch 163-2.

FIG. 11A to FIG. 11D show simulation results of the antenna unit shown in FIG. 10 and the performance of the antenna unit shown in FIG. 10 will be described below in connection with the simulation results of the antenna unit.

Figure 11A:
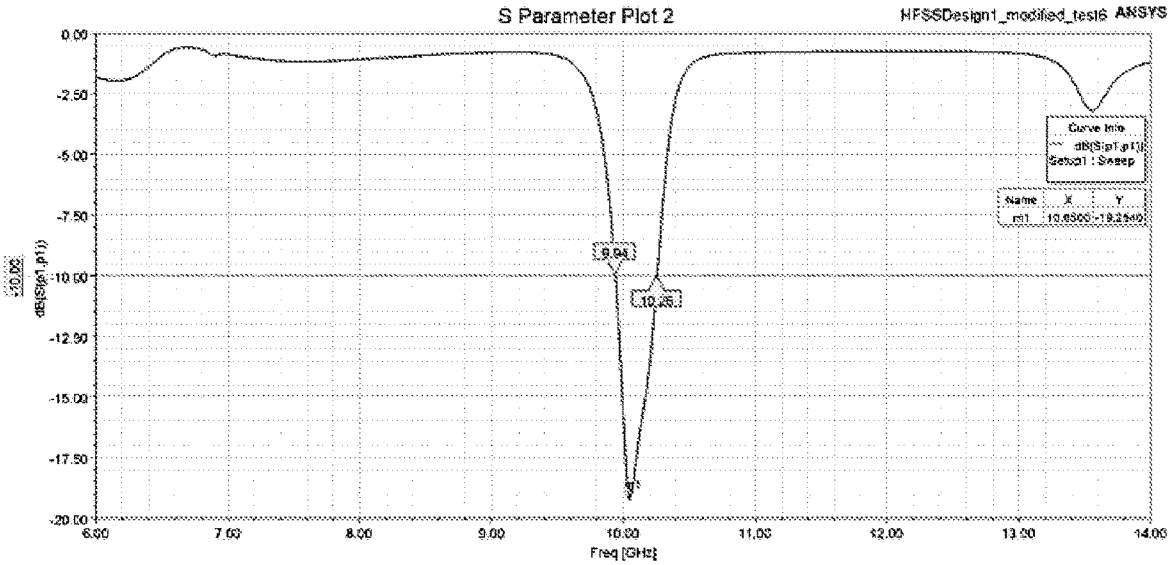
FIGS. 11A to 11D are schematic diagrams of simulation results of the antenna unit shown in FIG. 10.

FIG. 11A shows a reflection coefficient (S11 parameter) curve in the scattering parameter (S parameter) of the antenna unit shown in FIG. 10, as shown in FIG. 11A, a −10 dB (decibel) impedance bandwidth of this antenna unit is about 9.94 GHz (gigahertz) to 10.26 GHz, and the antenna unit exhibits a one-order filtering response characteristic.

Figure 11B:
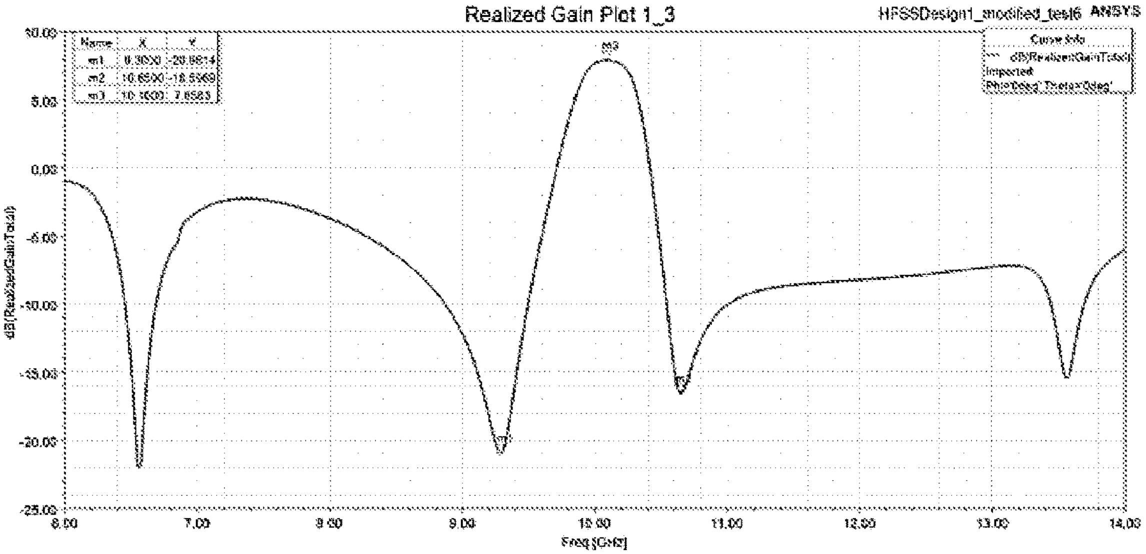

FIG. 11B shows a gain curve of the antenna unit shown in FIG. 10 which has a gain of about 8 dBi in the passband and has a good gain flatness in the passband as shown in FIG. 11B; the antenna unit has a radiation zero point on the left side and right side of the passband respectively, where the two radiation zero points are at 9.3 GHz and 10.65 GHz respectively; and the stop-band suppression of the antenna unit in the upper sideband is better than that in the lower sideband.

According to the electric field distribution of the antenna unit at the central frequency point (i.e. 10.1 GHZ) and two radiation zero points (i.e. 9.3 GHz and 10.65 GHz) shown in FIG. 10, as well as the magnetic field distribution of the antenna unit at the center frequency point (i.e. 10.1 GHZ) and two radiation zero points (i.e. 9.3 GHz and 10.65 GHz) shown in FIG. 10, it can be seen that the electric field of the antenna unit on the radiation patch at the center frequency point (i.e. 10.1 GHZ) is very strong, while the field intensity of the radiation patch at the two radiation zeros (i.e. 9.3 GHz and 10.65 GHz) is very weak, and the antenna unit hardly radiates; and the magnetic coupling strength of the antenna unit at the upper zero point is weaker than that at the lower zero point, so the out-of-band suppression level of the antenna unit at the upper zero point is better than that at the lower zero point.

Figure 11C:
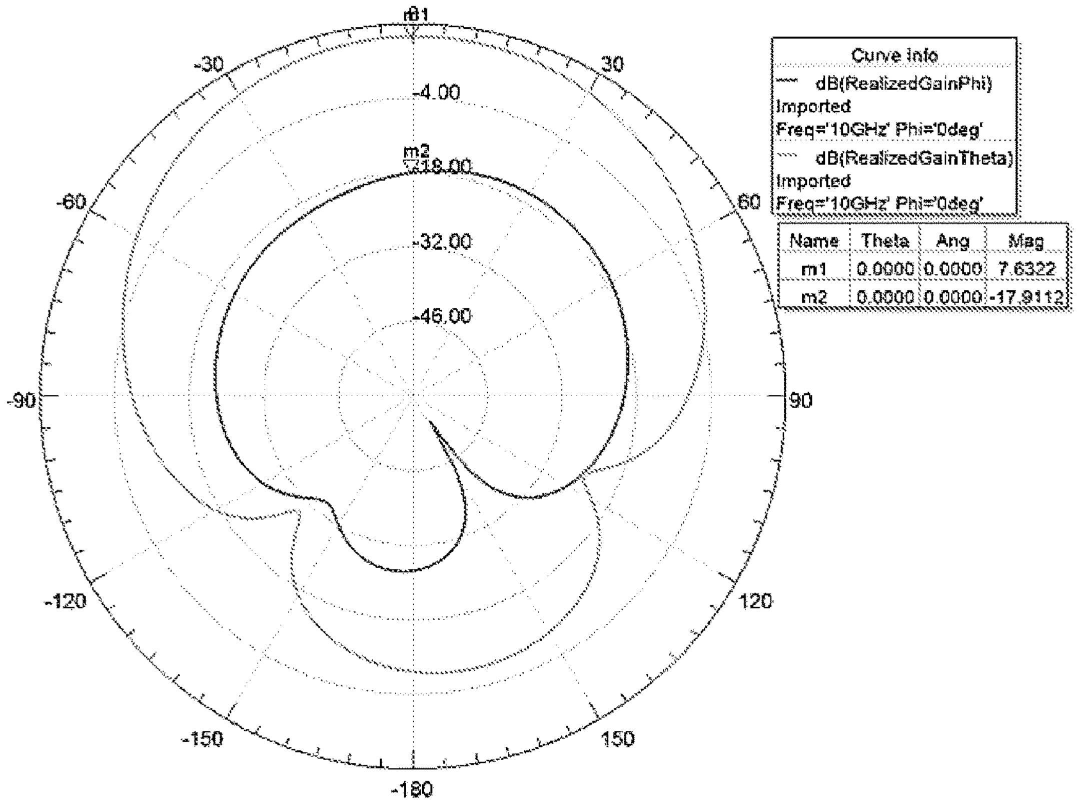
Figure 11D:
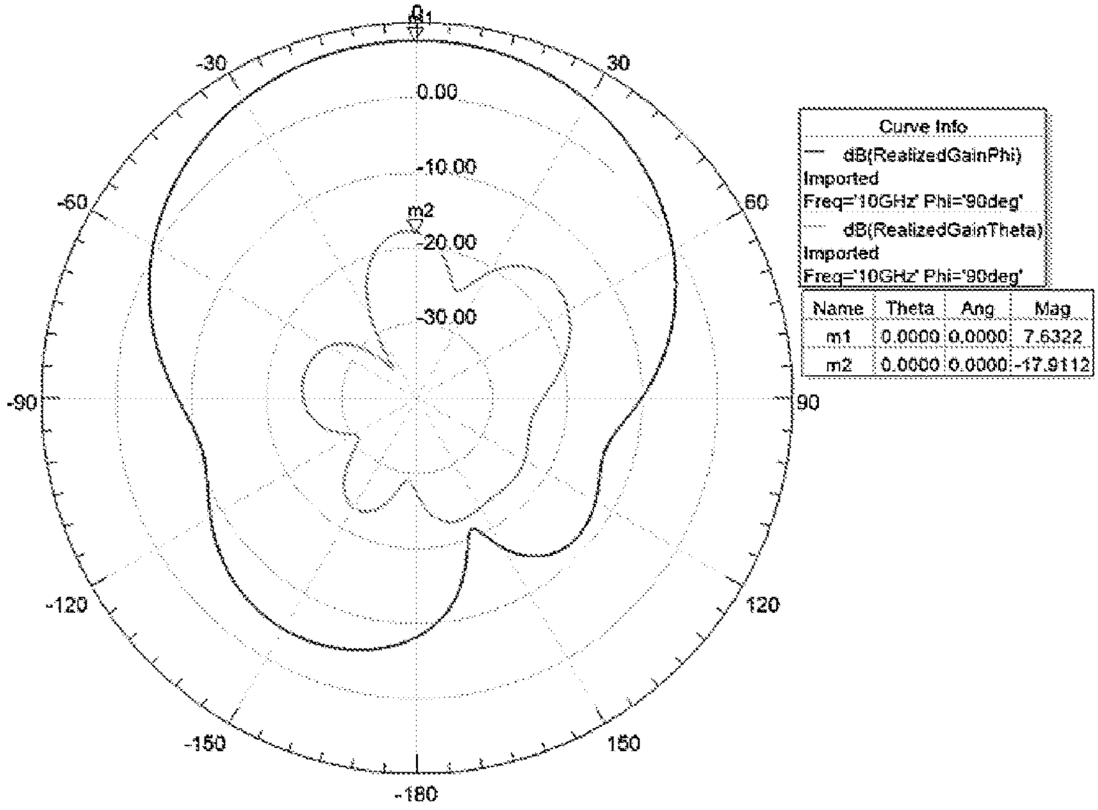

FIG. 11C to FIG. 11D show radiation patterns of the antenna unit shown in FIG. 10 in the E-plane and the H-plane, and as shown in FIG. 11C to FIG. 11D, the antenna unit within the passband has a low cross-polarization level and a stable radiation mode.

Furthermore, the floor groove 17 may include a first groove, a second groove, and a third groove arranged sequentially along the first direction Y, wherein a width of the first groove is equal to that of the third groove, and a width of the second groove is smaller than that of the first groove. According to the simulation results, when a length of the second groove varies from about 2.0 mm to 2.65 mm, there is substantially no effect on performance of the antenna unit. The width of the groove refers to a dimensional characteristic along the second direction X, and the length of the groove refers to a dimensional characteristic along the first direction Y.

The antenna unit shown in FIG. 10 changes the shape of the floor groove 17 in the ground layer 13 with respect to the antenna unit shown in FIG. 8. Compared with the simulation results of the antenna unit shown in FIG. 8, as can be seen from the simulation results of the antenna unit shown in FIG. 10, the gain flatness within the passband of the antenna unit shown in FIG. 10 decreases slightly, and the electric field strength of the antenna unit shown in FIG. 10 on the radiation patch at the lower zero point is greater than that of the antenna unit shown in FIG. 8 on the radiation patch at the lower zero point. Therefore, the out-of-band suppression of the lower sideband of the antenna unit shown in FIG. 10 is slightly decreased, but there is no obvious effect on antenna filtering performance and antenna radiation performance of the antenna unit, and there is no obvious effect on the cross polarization of the antenna unit.

As can be seen from the above, in the antenna unit provided by the embodiments of the present disclosure, the floor groove, the microstrip coupling line structure and the microstrip feed line form a conversion structure by arranging a spacing area between the microstrip coupling line structure and the microstrip feed line, and by partly overlapping an orthographic projection of the floor groove on the dielectric substrate with an orthographic projection of the microstrip feed line on the dielectric substrate and partly overlapping an orthographic projection of the floor groove on the dielectric substrate with an orthographic projection of an end of the microstrip coupling line structure close to the microstrip feed line (i.e. a first branch structure in the microstrip coupling line structure) on the dielectric substrate. In this way, a conversion between the single-ended signal and the differential signal, a hybrid electromagnetic coupling in the antenna unit, and a better filtering function can be achieved by the conversion structure. Therefore, a fusion design of the antenna, the filter and the Balun is achieved by forming a conversion structure without introducing additional filtering circuit and loading complex parasitic structure, thereby antenna unit having the characteristics of simple antenna structure, small size, low structural profile, low cost, easy to be processed and easy to be integrated with other modules, and ensuring excellent antenna performance.

Figure 12:
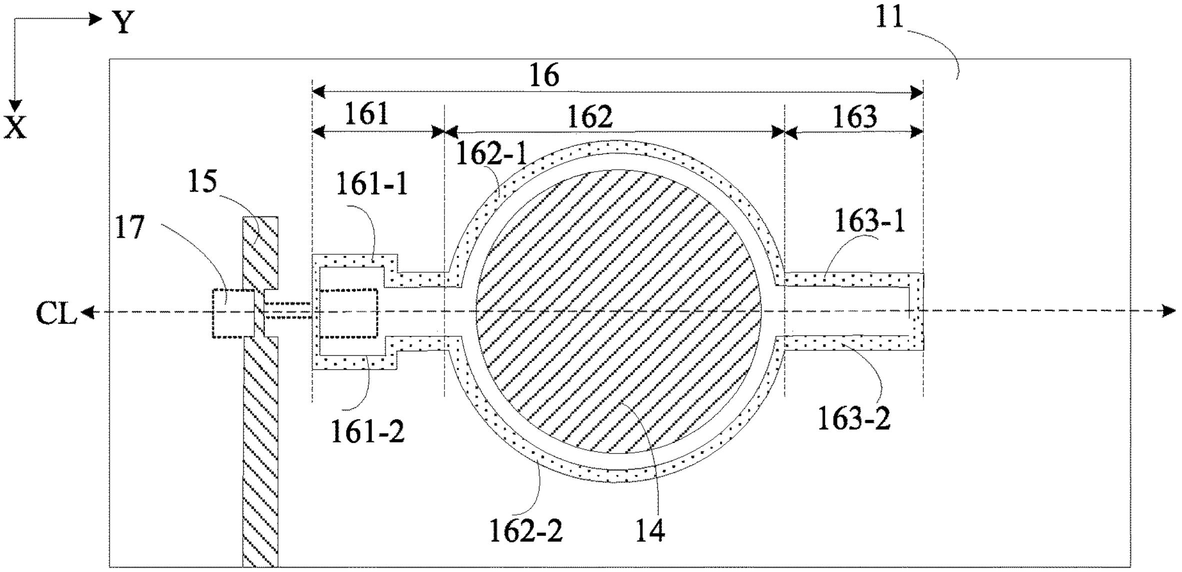
FIG. 12 is a schematic diagram of a fifth structure of the antenna unit in an exemplary embodiment of the present disclosure.

Embodiments of the present disclosure provide an antenna unit. FIG. 12 is a schematic diagram of a fifth structure of an antenna unit in an exemplary embodiment of the present disclosure, and as shown in FIG. 12, the antenna unit may include a dielectric substrate 11, an antenna layer 12 located on a side of a first surface of the dielectric substrate 11, and a ground layer 13 located on a side of a second surface of the dielectric substrate 11 in a direction perpendicular to a plane of the antenna unit (i.e., a third direction Z). Among them, the first surface and the second surface are the two surfaces of the dielectric substrate facing away from each other, the antenna layer 12 may include a microstrip feed line 15, a radiation patch 14 located on a side of the microstrip feed line 15 along the first direction Y and a microstrip coupling line structure 16 that at least partially surrounds the radiation patch 14, and the ground layer 13 may include a floor groove 17. A spacing area is provided between the microstrip coupling line structure 16 and the microstrip feed line 15, an orthographic projection of the floor groove 17 on the dielectric substrate 11 partially overlaps with an orthographic projection of the microstrip feed line 15 on the dielectric substrate 11, and an orthographic projection of the floor groove 17 on the dielectric substrate 11 partially overlaps with an orthographic projection of an end of the microstrip coupling line structure 16 close to the microstrip feed line 15 on the dielectric substrate 11 in order that a conversion structure is formed, which allows a conversion between single-ended and differential signals, a hybrid electromagnetic coupling in the antenna unit, and a better filtering function.

In an exemplary embodiment, as shown in FIG. 12, the floor groove 17 may extend in the first direction Y, and the floor groove 17 may be in an “H” shape. For example, the floor groove 17 may include a first groove, a second groove, and a third groove arranged sequentially along the first direction Y, wherein a width of the second groove is different from a width of the first groove and a width of the third groove. For example, the width of the second groove is smaller than the width of the first groove, and is smaller than the width of the third groove. For example, a width of the first groove is equal to the width of the third groove. Among them, the width of the groove refers to a dimensional characteristic along the second direction X. Among them, the second direction X crosses the first direction Y. Here, no limit is made thereto in the embodiment of the present disclosure.

In an exemplary embodiment, as shown in FIG. 12, the microstrip feed line 15 may be a step impedance microstrip feed line. For example, the microstrip feed line 15 may extend along the second direction X, and the microstrip feed line 15 may be in an “H” shape. For example, the microstrip feed line 15 may include a first feed line, a second feed line, and a third feed line which are arranged sequentially along the second direction X, wherein a width of the second feed line is different from a width of the first feed line and a width of the third feed line. For example, the width of the second feed line is smaller than the width of the first feed line, and is smaller than the width of the third feed line. For example, a width of the first feed line is equal to the width of the third feed line. Among them, the width of the feed line refers to a dimensional characteristic along the first direction Y. Among them, the second direction X crosses the first direction Y. Here, no limit is made thereto in the embodiment of the present disclosure.

In an exemplary embodiment, as shown in FIG. 12, the shape of the radiation patch 14 may be circular.

In an exemplary embodiment, as shown in FIG. 12, the microstrip coupling line structure 16 may include a microstrip coupling line 162, and a first branch structure 161 and a second branch structure 163 connected to the microstrip coupling line 162, wherein the first branch structure 161 and the second branch structure 163 are located on both sides of the microstrip coupling line 162 along the first direction Y, and the first branch structure 161 is a closed branch structure and the second branch structure 163 is a closed branch structure. Among them, a second end of the first branch structure 161 is connected to a first end of the microstrip coupling line 162, and a second end of the microstrip coupling line 162 is connected to a first end of the second branch structure 163.

In an exemplary embodiment, as shown in FIG. 12, the first branch structure 161 may be an axisymmetric structure and a symmetry axis of the first branch structure 161 may be the center line CL of the dielectric substrate. For example, the first branch structure 161 may include a first branch 161-1 extending along the first direction Y and a second branch 161-2 extending along the first direction Y, wherein the first branch 161-1 and the second branch 161-2 may be symmetrically arranged on both sides of the center line CL of the dielectric substrate. For example, both the first branch 161-1 and the second branch 161-2 may include two “L” shaped branches connected sequentially. Here, no limit is made thereto in the embodiment of the present disclosure.

In an exemplary embodiment, as shown in FIG. 12, the microstrip coupling lines 162 may be an axisymmetric structure, and the symmetry axis of the microstrip coupling lines 162 may be the center line CL of the dielectric substrate. For example, the microstrip coupling line 162 may include a first microstrip coupling line 162-1 and a second microstrip coupling line 162-2, which may be symmetrically arranged on both sides of the center line CL of the dielectric substrate. For example, taking an example that a shape of the radiation patch 14 is a circular shape, the first microstrip coupling line 162-1 and the second microstrip coupling line 162-2 may be in an arc-shaped. Here, no limit is made thereto in the embodiment of the present disclosure.

In an exemplary embodiment, as shown in FIG. 12, the second branch structure 163 may be an axisymmetric structure and a symmetry axis of the second branch structure 163 may be the center line CL of the dielectric substrate. For example, the second branch structure 163 may include a third branch 163-1 extending along the first direction Y and a fourth branch 163-2 extending along the first direction Y, wherein the third branch 163-1 and the fourth branch 163-2 may be symmetrically arranged on both sides of the center line CL of the dielectric substrate. For example, both the third branch 163-1 and the fourth branch 163-2 may be a “L” shaped branch extending along the first direction Y. Here, no limit is made thereto in the embodiment of the present disclosure.

In an exemplary embodiment, as shown in FIG. 12, a first end of the first branch 161-1 is connected to a first end of the second branch 161-2, a second end of the first branch 161-1 is connected to a first end of the first microstrip coupling line 162-1, a second end of the first microstrip coupling line 162-1 is connected to a first end of the third branch 163-1, a second end of the second branch 161-2 is connected to a first end of the second microstrip coupling line 162-2, a second end of the second microstrip coupling line 162-2 is connected to a first end of the fourth branch 163-2, and a second end of the third branch 163-1 is connected to a second end of the fourth branch 163-2.

FIG. 13A to FIG. 13D show simulation results of the antenna unit shown in FIG. 12 and the performance of the antenna unit shown in FIG. 12 will be described below in connection with the simulation results of the antenna unit.

Figure 13A:
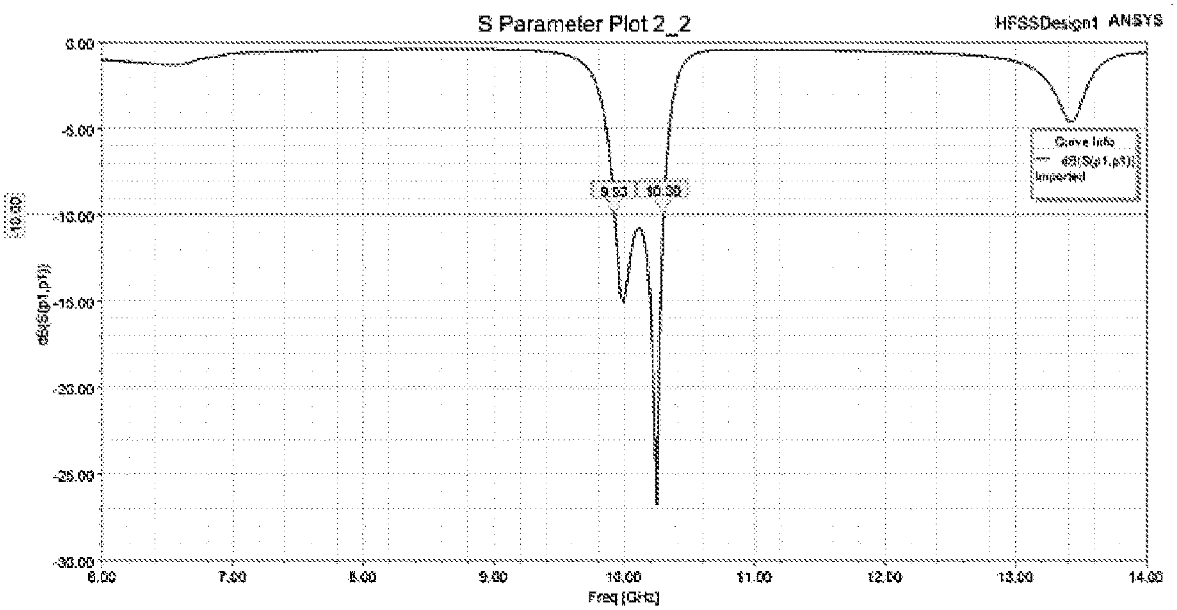
FIGS. 13A to 13D are schematic diagrams of simulation results of the antenna unit shown in FIG. 12.

FIG. 13A shows a reflection coefficient (S11 parameter) curve in the scattering parameter (S parameter) of the antenna unit shown in FIG. 12, as shown in FIG. 13A, a −10 dB (decibel) impedance bandwidth of this antenna unit is about 9.93 GHZ (gigahertz) to 10.30 GHz, and the antenna unit exhibits a second-order filtering response characteristic. Among them, compared to the antenna unit shown in FIG. 10, the impedance bandwidth of the antenna unit shown in FIG. 12 is slightly wider, and the order of filtering response is better.

Figure 13B:
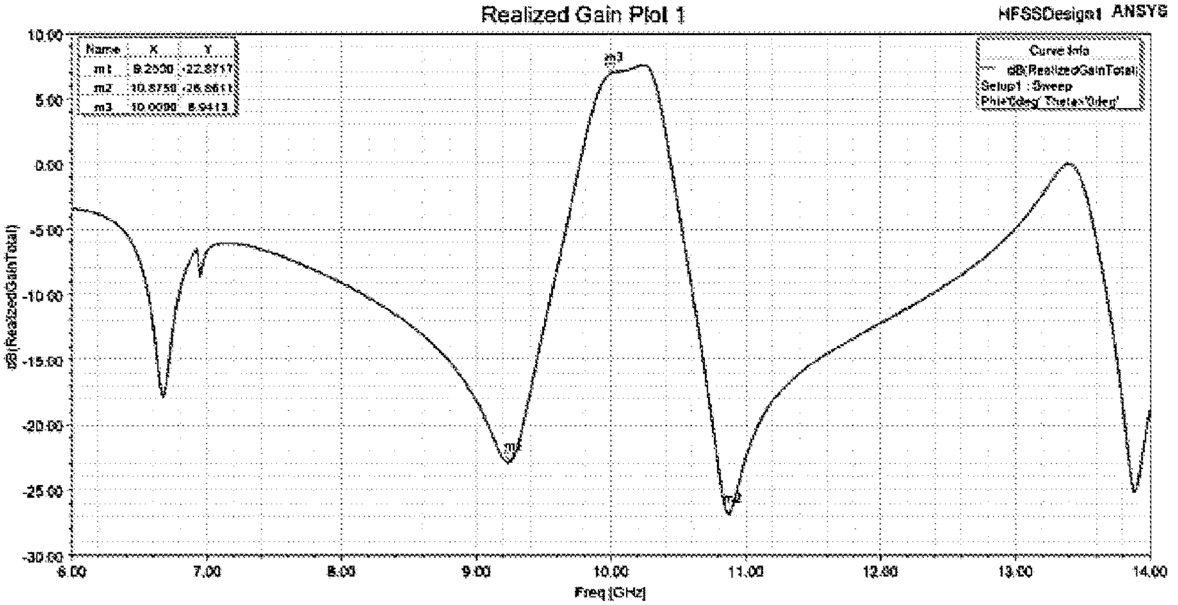

FIG. 13B shows a gain curve of the antenna unit shown in FIG. 12 which has a gain of about 7 dBi in the passband and has a good gain flatness in the passband as shown in FIG. 13B; the antenna unit has a radiation zero point on the left side and right side of the passband respectively, where the two radiation zeros are at 9.25 GHz and 10.875 GHz respectively; and the stop-band suppression of the antenna unit in the lower sideband is better than that in the upper sideband.

According to the electric field distribution of the antenna unit at the central frequency point (i.e. 10.0 GHZ) and two radiation zero points (i.e. 9.25 GHz and 10.875 GHz) shown in FIG. 12, as well as the magnetic field distribution of the antenna unit at the center frequency point (i.e. 10.0 GHz) and two radiation zero points (i.e. 9.25 GHz and 10.875 GHz) shown in FIG. 12, it can be seen that the electric field of the antenna unit on the radiation patch at the center frequency point (i.e. 10.0 GHz) is very strong, while the field intensity of the radiation patch at the two radiation zeros (i.e. 9.25 GHz and 10.875 GHz) is very weak, and the antenna unit hardly radiates; and the magnetic coupling strength of the antenna unit at the upper zero point is not much different from that at the lower zero point, but the out-of-band suppression level at the lower zero point is better than that at the upper zero point because the electric field distribution at the lower zero point is slightly stronger than that at the upper zero point.

Figure 13C:
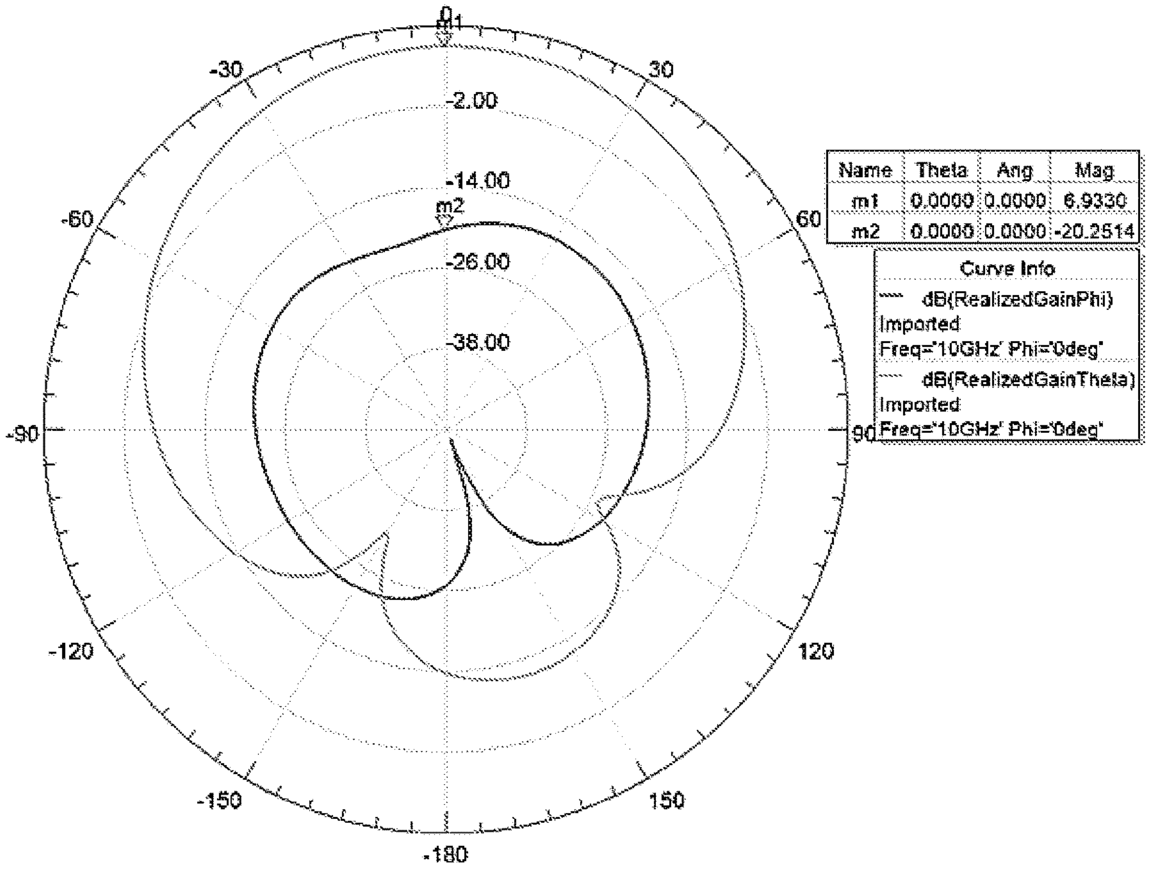
Figure 13D:
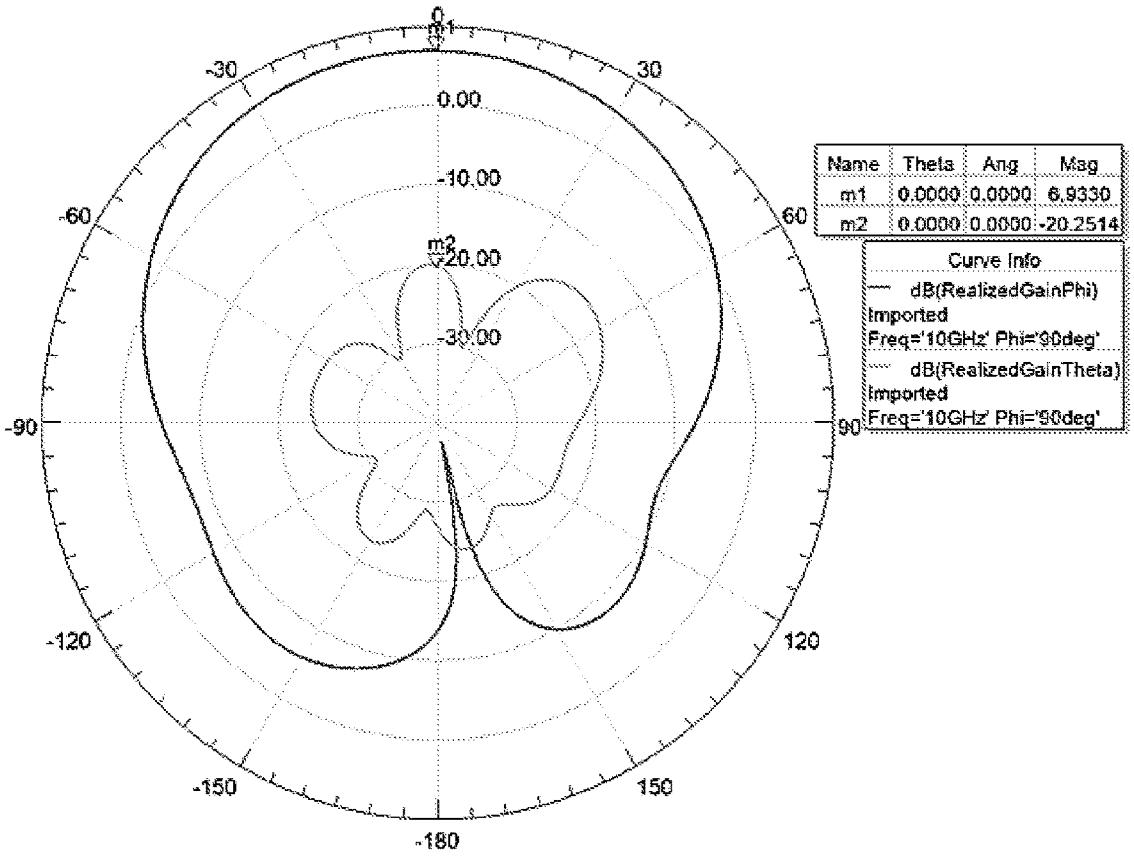

FIG. 13C to FIG. 13D show radiation patterns of the antenna unit shown in FIG. 12 in the E-plane and the H-plane, and as shown in FIG. 13C to FIG. 13D, the antenna unit within the passband has a low cross-polarization level and a stable radiation mode.

In addition, taking as an example that the microstrip feed line 15 may include a first feed line, a second feed line and a third feed line arranged sequentially along the second direction X, wherein a width of the second feed line is smaller than that of the first feed line and the width of the first feed line is equal to that of the third feed line, the microstrip feed line 15 in the antenna unit shown in FIG. 12 changes from a uniform impedance microstrip feed line to a step impedance microstrip feed line with respect to the antenna unit shown in FIG. 10. Compared with the simulation results of the antenna unit shown in FIG. 10, as can be seen from the simulation results of the antenna unit shown in FIG. 12, the change of the microstrip feed line 15 from the uniform impedance microstrip feed line to the step impedance microstrip feed line has no significant effect on the antenna filtering performance and the antenna radiation performance of the antenna unit, and has no significant effect on the cross polarization of the antenna unit, slightly affecting the sideband suppression level of the upper sideband and the lower sideband.

As can be seen from the above, in the antenna unit provided by the embodiments of the present disclosure, the floor groove, the microstrip coupling line structure and the microstrip feed line form a conversion structure by arranging a spacing area between the microstrip coupling line structure and the microstrip feed line, and by partly overlapping an orthographic projection of the floor groove on the dielectric substrate with an orthographic projection of the microstrip feed line on the dielectric substrate and partly overlapping an orthographic projection of the floor groove on the dielectric substrate with an orthographic projection of an end of the microstrip coupling line structure close to the microstrip feed line (i.e. a first branch structure in the microstrip coupling line structure) on the dielectric substrate. In this way, a conversion between the single-ended signal and the differential signal, a hybrid electromagnetic coupling in the antenna unit, and a better filtering function can be achieved by the conversion structure. Therefore, a fusion design of the antenna, the filter and the Balun is achieved by forming the conversion structure without introducing additional filtering circuit and loading complex parasitic structure, thereby antenna unit having the characteristics of simple antenna structure, small size, low structural profile, low cost, easy to be processed and easy to be integrated with other modules, and ensuring excellent antenna performance.

Figure 14:
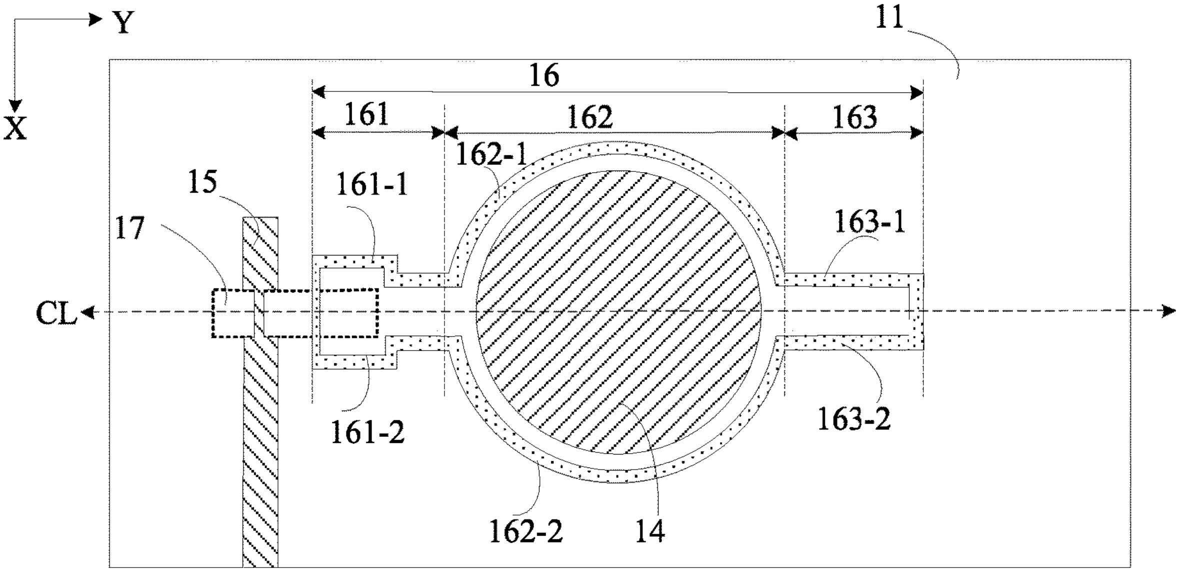
FIG. 14 is a schematic diagram of a sixth structure of the antenna unit in an exemplary embodiment of the present disclosure.

Embodiments of the present disclosure provide an antenna unit. FIG. 14 is a schematic diagram of a six structure of an antenna unit in an exemplary embodiment of the present disclosure, and as shown in FIG. 14, the antenna unit may include a dielectric substrate 11, an antenna layer 12 located on a side of a first surface of the dielectric substrate 11, and a ground layer 13 located on a side of a second surface of the dielectric substrate 11 in a direction perpendicular to a plane of the antenna unit (i.e., a third direction Z). Among them, the first surface and the second surface are the two surfaces of the dielectric substrate facing away from each other, the antenna layer 12 may include a microstrip feed line 15, a radiation patch 14 located on a side of the microstrip feed line 15 along the first direction Y and a microstrip coupling line structure 16 that at least partially surrounds the radiation patch 14, and the ground layer 13 may include a floor groove 17. A spacing area is provided between the microstrip coupling line structure 16 and the microstrip feed line 15, an orthographic projection of the floor groove 17 on the dielectric substrate 11 partially overlaps with an orthographic projection of the microstrip feed line 15 on the dielectric substrate 11, and an orthographic projection of the floor groove 17 on the dielectric substrate 11 partially overlaps with an orthographic projection of an end of the microstrip coupling line structure 16 close to the microstrip feed line 15 on the dielectric substrate 11 in order that a conversion structure is formed, so that a conversion between single-ended and differential signals, a hybrid electromagnetic coupling in the antenna unit, and a better filtering function can be achieved.

In an exemplary embodiment, as shown in FIG. 14, the floor groove 17 may extend in the first direction Y, and the floor groove 17 may be in a "-" shape. For example, the floor groove 17 may be a rectangular groove.

In an exemplary embodiment, as shown in FIG. 14, the microstrip feed line 15 may be a step impedance microstrip feed line. For example, the microstrip feed line 15 may extend along the second direction X, and the microstrip feed line 15 may be in an "H" shape. For example, the microstrip feed line 15 may include a first feed line, a second feed line, and a third feed line which are arranged sequentially along the second direction X, wherein a width of the second feed line is different from a width of the first feed line and a width of the third feed line. For example, the width of the second feed line is smaller than the width of the first feed line, and is smaller than the width of the third feed line. For example, a width of the first feed line is equal to the width of the third feed line. Among them, the width of the feed line refers to a dimensional characteristic along the first direction Y. Among them, the second direction X crosses the first direction Y. Here, no limit is made thereto in the embodiment of the present disclosure.

In an exemplary embodiment, as shown in FIG. 14, the shape of the radiation patch 14 may be circular.

In an exemplary embodiment, as shown in FIG. 14, the microstrip coupling line structure 16 may include a microstrip coupling line 162, and a first branch structure 161 and a second branch structure 163 connected to the microstrip coupling line 162, wherein the first branch structure 161 and the second branch structure 163 are located on both sides of the microstrip coupling line 162 along the first direction Y respectively, and the first branch structure 161 is a closed branch structure and the second branch structure 163 is a closed branch structure. Among them, a second end of the first branch structure 161 is connected to a first end of the microstrip coupling line 162, and a second end of the microstrip coupling line 162 is connected to a first end of the second branch structure 163.

In an exemplary embodiment, as shown in FIG. 14, the first branch structure 161 may be an axisymmetric structure and a symmetry axis of the first branch structure 161 may be the center line CL of the dielectric substrate. For example, the first branch structure 161 may include a first branch 161-1 extending along the first direction Y and a second branch 161-2 extending along the first direction Y, wherein the first branch 161-1 and the second branch 161-2 may be symmetrically arranged on both sides of the center line CL of the dielectric substrate. For example, both the first branch 161-1 and the second branch 161-2 may include two "L" shaped branches connected sequentially. Here, no limit is made thereto in the embodiment of the present disclosure.

In an exemplary embodiment, as shown in FIG. 14, the microstrip coupling lines 162 may have an axisymmetric structure, and the symmetry axis of the microstrip coupling lines 162 may be the center line CL of the dielectric substrate. For example, the microstrip coupling line 162 may include a first microstrip coupling line 162-1 and a second microstrip coupling line 162-2, which may be symmetrically arranged on both sides of the center line CL of the dielectric substrate. For example, taking an example that a shape of the radiation patch 14 is a circular shape, the first microstrip coupling line 162-1 and the second microstrip coupling line 162-2 may be in an arc-shaped. Here, no limit is made thereto in the embodiment of the present disclosure.

In an exemplary embodiment, as shown in FIG. 14, the second branch structure 163 may be an axisymmetric structure and a symmetry axis of the second branch structure 163 may be the center line CL of the dielectric substrate. For example, the second branch structure 163 may include a third branch 163-1 extending along the first direction Y and a fourth branch 163-2 extending along the first direction Y, wherein the third branch 163-1 and the fourth branch 163-2 may be symmetrically arranged on both sides of the center line CL of the dielectric substrate. For example, both the third branch 163-1 and the fourth branch 163-2 may be a "L" shaped branch extending along the first direction Y. Here, no limit is made thereto in the embodiment of the present disclosure.

In an exemplary embodiment, as shown in FIG. 14, a first end of the first branch 161-1 is connected to a first end of the second branch 161-2, a second end of the first branch 161-1 is connected to a first end of the first microstrip coupling line 162-1, a second end of the first microstrip coupling line 162-1 is connected to a first end of the third branch 163-1, a second end of the second branch 161-2 is connected to a first end of the second microstrip coupling line 162-2, a second end of the second microstrip coupling line 162-2 is connected to a first end of the fourth branch 163-2, and a second end of the third branch 163-1 is connected to a second end of the fourth branch 163-2.

FIG. 15A to FIG. 15D show simulation results of the antenna unit shown in FIG. 14 and the performance of the antenna unit shown in FIG. 14 will be described below in connection with the simulation results of the antenna unit.

Figure 15A:
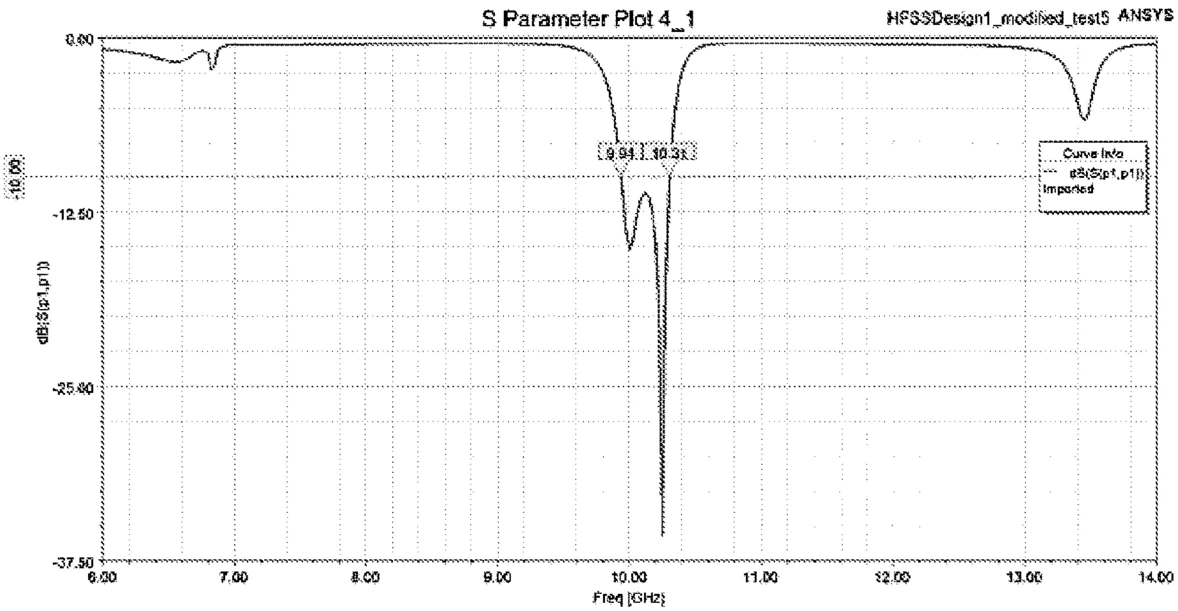
FIGS. 15A to 15D are schematic diagrams of simulation results of the array unit shown in FIG. 14.

FIG. 15A shows a reflection coefficient (S11 parameter) curve in the scattering parameter (S parameter) of the antenna unit shown in FIG. 14, as shown in FIG. 15A, a −10 dB (decibel) impedance bandwidth of this antenna unit is about 9.94 GHz (gigahertz) to 10.31 GHz, and the antenna unit exhibits a second-order filtering response characteristic. Among them, compared to the antenna unit shown in FIG. 12, the impedance bandwidth of the antenna unit shown in FIG. 14 does not change significantly.

Figure 15B:
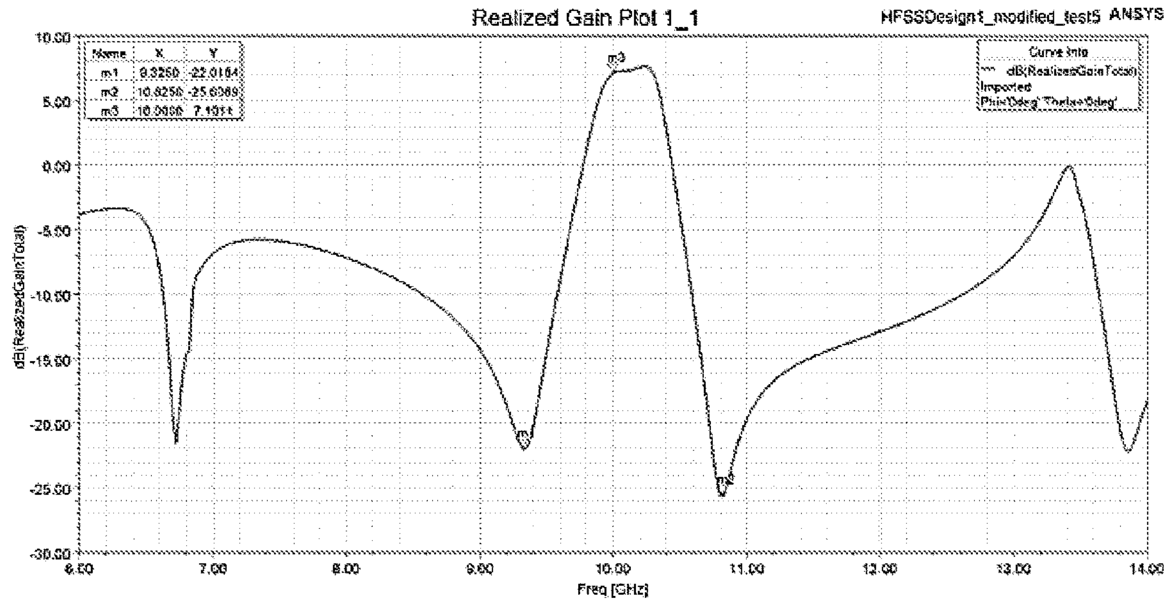

FIG. 15B shows a gain curve of the antenna unit shown in FIG. 14 which has a gain of about 7 dBi in the passband and has a good gain flatness in the passband as shown in FIG. 15B; the antenna unit has a radiation zero point on the left side and right side of the passband respectively, where the two radiation zeros are at 9.325 GHz and 10.825 GHz respectively; and the stop-band suppression of the antenna unit in the lower sideband is better than that in the upper sideband.

According to the electric field distribution of the antenna unit at the central frequency point (i.e. 10.0 GHz) and two radiation zero points (i.e. 9.325 GHz and 10.825 GHz) shown in FIG. 14, as well as the magnetic field distribution of the antenna unit at the center frequency point (i.e. 10.0 GHZ) and two radiation zero points (i.e. 9.325 GHz and 10.825 GHz) shown in FIG. 14, it can be seen that the electric field of the antenna unit on the radiation patch at the center frequency point (i.e. 10.0 GHz) is very strong, while the field intensity of the radiation patch at the two radiation zeros (i.e. 9.325 GHz and 10.825 GHz) is very weak, and the antenna unit hardly radiates; and the magnetic coupling strength of the antenna unit at the upper zero point is not much different from that at the lower zero point, but the out-of-band suppression level at the lower zero point is better than that at the upper zero point because the electric field distribution at the lower zero point is slightly stronger than that at the upper zero point.

Figure 15C:
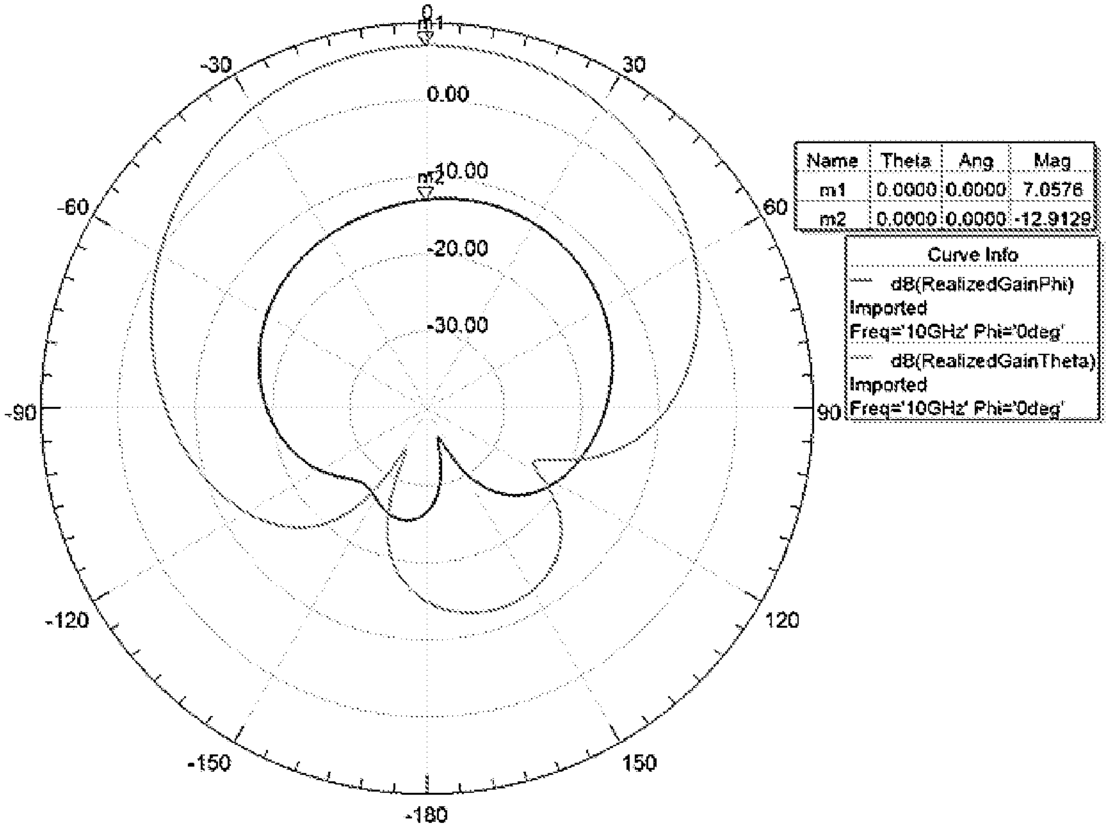
Figure 15D:
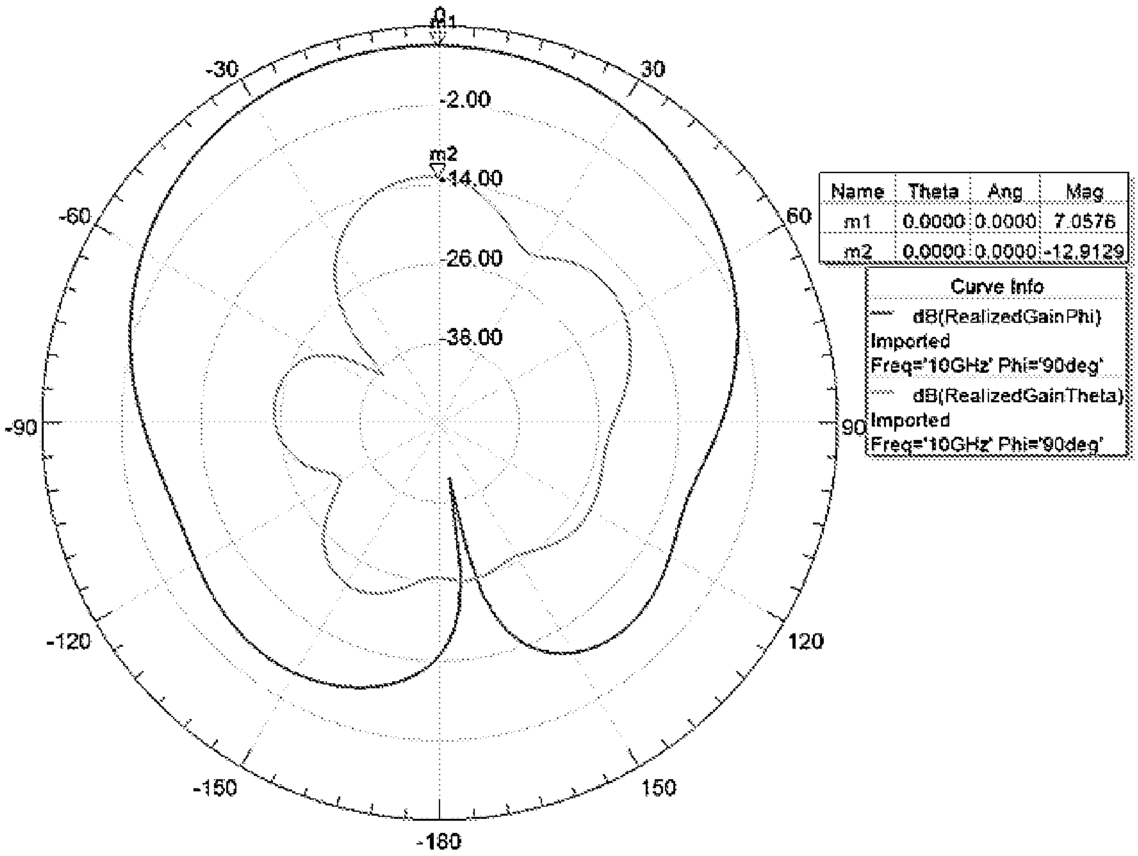

FIG. 15C to FIG. 15D show radiation patterns of the antenna unit shown in FIG. 14 in the E-plane and the H-plane, and as shown in FIG. 15C to FIG. 15D, the antenna unit within the passband has a low cross-polarization level and a stable radiation mode.

Furthermore, the floor groove 17 in the antenna unit shown in FIG. 14 is changed into a rectangular groove in a "-" shape with respect to the antenna unit shown in FIG. 12. Compared with the simulation results of the antenna unit shown in FIG. 12, as can be seen from the simulation results of the antenna unit shown in FIG. 14, the change of the floor groove 17 into a rectangular groove in the shape of a "-" has no obvious effect on the antenna filtering performance and the antenna radiation performance of the antenna unit, and affects the cross polarization of the antenna unit (for example, from −27 dB to −20 dB), and affects the sideband suppression level of the lower sideband.

As can be seen from the above, in the antenna unit provided by the embodiments of the present disclosure, the floor groove, the microstrip coupling line structure and the microstrip feed line form a conversion structure by arranging a spacing area between the microstrip coupling line structure and the microstrip feed line, and by partly overlapping an orthographic projection of the floor groove on the dielectric substrate with an orthographic projection of the microstrip feed line on the dielectric substrate and partly overlapping an orthographic projection of the floor groove on the dielectric substrate with an orthographic projection of an end of the microstrip coupling line structure close to the microstrip feed line (i.e. a first branch structure in the microstrip coupling line structure) on the dielectric substrate. In this way, a conversion between the single-ended signal and the differential signal, a hybrid electromagnetic coupling in the antenna unit, and a better filtering function can be achieved by the conversion structure. Therefore, a fusion design of the antenna, the filter and the Balun is achieved by forming the conversion structure without introducing additional filtering circuit and loading complex parasitic structure, enabling antenna unit having the characteristics of simple antenna structure, small size, low structural profile, low cost, easy to be processed and easy to be integrated with other modules, and ensuring excellent antenna performance.

Embodiments of the present disclosure also provide an electronic device, which may include an antenna unit in one or more of the above embodiments.

In an exemplary embodiment, the electronic device may include but is not limited to any product or component with a communication function such as a mobile phone, a tablet computer, a television, a display, a notebook computer, a digital photo frame, or a navigator, etc. Here, there is no limitation on a type of the electronic device in the embodiment of the present disclosure. Other essential components included by the electronic device which should be understood by those of ordinary skill in the art will not be described repeatedly herein, and should not be taken as a limitation to the present disclosure.

The above description of the embodiments of the electronic device is similar to the above description of the embodiments of the antenna unit, and has the similar advantages. Technical details undisclosed in the embodiments of the electronic device of the present disclosure may be understood by those skilled in the art with reference to the descriptions in the embodiments of the antenna unit of the present disclosure, which will not be repeated here.

In addition, the electronic device in the embodiment of the present disclosure may include other needed compositions and structures in addition to the above-mentioned structure, and the skilled person in the art may perform designing and supplementing accordingly according to the type of the electronic device, which will not be described here.

Although the implementation modes of the present disclosure are disclosed above, the contents are only implementation modes for easily understanding the present disclosure and not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. An antenna unit, comprising:

a dielectric substrate, an antenna layer and a ground layer located on both sides of the dielectric substrate respectively, wherein:

the antenna layer comprises a microstrip feed line, a radiation patch and a microstrip coupling line structure located on a side of the microstrip feed line in a first direction, the microstrip coupling line structure comprises a first branch structure, a microstrip coupling line and a second branch structure that are sequentially connected along the first direction, the first branch structure is arranged at intervals with the microstrip feed line, and the ground layer includes a floor groove, wherein there is a first overlapping area between an orthographic projection of the floor groove on the dielectric substrate and an orthographic projection of the microstrip feed line on the dielectric substrate, and there is a second overlapping area between the orthographic projection of the floor groove and an orthographic projection of the first branch structure on the dielectric substrate;

the microstrip feed line is in a “-” shape;

the floor groove is in a “-” shape;

the microstrip feed line is a uniform impedance microstrip feed line; and the radiation patch is in a shape of a rectangle or a diamond.

2. The antenna unit according to claim 1, wherein the dielectric substrate comprises a first reference line extending in the first direction and a second reference line extending in a second direction, wherein at least one of the floor groove, the radiation patch, the first branch structure, the microstrip coupling line and the second branch structure is arranged symmetrically with respect to the first reference line, and the microstrip feed line is arranged symmetrically with respect to the second reference line, the first reference line being perpendicular to the second reference line.

3. The antenna unit according to claim 1, wherein the floor groove comprises a first groove, a second groove and a third groove arranged sequentially along the first direction, wherein an orthographic projection of a first end of the second groove on the dielectric substrate is located in the first overlapping area, an orthographic projection of a second end of the second groove on the dielectric substrate is located in the second overlapping area, a width of the second groove is smaller than a width of the first groove, the width of the first groove is equal to a width of the third groove, and the width of the groove refers to a dimensional characteristic along the second direction, the second direction is perpendicular to the first direction.

4. The antenna unit according to claim 3, wherein at least one of the width of the first groove, the width of the second groove and the width of the third groove is 0.25 mm to 1.8 mm.

5. The antenna unit according to claim 3, wherein a length of the second groove is 2.0 mm to 2.65 mm, and the length of the groove refers to a dimensional feature along the first direction.

6. The antenna unit of claim 1, wherein the microstrip feed line is the uniform impedance microstrip feed line extending along a second direction, and the second direction is perpendicular to the first direction.

7. The antenna unit according to claim 6, wherein the step impedance microstrip feed line includes a first feed line, a second feed line and a third feed line which are connected sequentially along the second direction, wherein a width of the second feed line is smaller than a width of the first feed line, the width of the first feed line is equal to a width of the third feed line, and the width of the feed line refers to a dimensional characteristic along the first direction.

8. The antenna unit according to claim 1, wherein the microstrip coupling line includes a first microstrip coupling line and a second microstrip coupling line located on both sides of the radiation patch in a second direction respectively.

9. The antenna unit according to claim 8, wherein the first branch structure comprises a first branch and a second branch which are located on a side of the radiation patch in an opposite direction of the first direction, wherein a first end of the first branch is connected with a first end of the second branch, a second end of the first branch is connected with a first end of the first microstrip coupling line, and a second end of the second branch is connected with a first end of the second microstrip coupling line.

10. The antenna unit according to claim 9, wherein the first branch includes a first sub-branch and a second sub-branch, and the second branch includes a third sub-branch and a fourth sub-branch, wherein a first end of the first sub-branch is connected with a first end of the third sub-branch, a second end of the first sub-branch is connected with a first end of the second sub-branch, a second end of the second sub-branch is connected to the first end of the first microstrip coupling line, a second end of the third sub-branch is connected to a first end of the fourth sub-branch, and a second end of the fourth sub-branch is connected to the first end of the second microstrip coupling line, the first sub-branch, the second sub-branch, the third sub-branch and the fourth sub-branch being “L” shaped branches.

11. The antenna unit according to claim 8, wherein the second branch structure comprises a third branch and a fourth branch which are located on a side of the radiation patch in the first direction, wherein a first end of the third branch is connected to a second end of the first microstrip coupling line, and a first end of the fourth branch is connected to a second end of the second microstrip coupling line; and a second end of the third branch is connected with a second end of the fourth branch.

12. The antenna unit of claim 11, wherein the third branch and fourth branch are "-" shaped branches.

13. The antenna unit of claim 1, wherein the microstrip feed line, the radiation patch, the microstrip coupling line, the first branch structure and the second branch structure are arranged in a same layer and made of a same material.

14. The antenna unit of claim 1, wherein the microstrip coupling line, the first branch structure and the second branch structure are connected with each other to form an integral structure.

15. An electronic device, comprising the antenna unit of claim 1.

16. The antenna unit of claim 11, wherein the third branch and fourth branch are "L" shaped branches.

17. The antenna unit according to claim 8, wherein the second branch structure comprises a third branch and a fourth branch which are located on a side of the radiation patch in the first direction, wherein a first end of the third branch is connected to a second end of the first microstrip coupling line, and a first end of the fourth branch is connected to a second end of the second microstrip coupling line; both the second end of the third branch and the second end of the fourth branch are connected with the ground layer through a via hole.

18. The antenna unit according to claim 8, wherein the second branch structure comprises a third branch and a fourth branch which are located on a side of the radiation patch in the first direction, wherein a first end of the third branch is connected to a second end of the first microstrip coupling line, and a first end of the fourth branch is connected to a second end of the second microstrip coupling line; and the second end of the third branch and the second end of the fourth branch are open-circuit.

* * * * *